US012700996B2

(12) United States Patent
Xie et al.

(10) Patent No.: US 12,700,996 B2
(45) Date of Patent: Aug. 4, 2026

(54) QUANTUM KEY TRANSMISSION METHOD, APPARATUS, AND SYSTEM

(71) Applicant: Huawei Technologies Co., Ltd., Shenzhen (CN)

(72) Inventors: Tianyuan Xie, Hangzhou (CN); Min Li, Shenzhen (CN); Hui Zhang, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 112 days.

(21) Appl. No.: 18/802,882

(22) Filed: Aug. 13, 2024

(65) Prior Publication Data

US 2025/0202688 A1     Jun. 19, 2025

Related U.S. Application Data

(63) Continuation of application No. PCT/CN2023/070073, filed on Jan. 3, 2023.

(30) Foreign Application Priority Data

Feb. 14, 2022    (CN) .......................... 202210132323.0
Feb. 28, 2022    (CN) .......................... 202210187877.0

(51) Int. Cl.
*H04L 9/08*         (2006.01)
*H04L 9/06*         (2006.01)
(52) U.S. Cl.
CPC .......... *H04L 9/0852* (2013.01); *H04L 9/0618* (2013.01)
(58) Field of Classification Search
None
See application file for complete search history.

(56) References Cited

U.S. PATENT DOCUMENTS

| | | | | |
|---|---|---|---|---|
| 12,278,895 B1* | 4/2025 | Stapleton | .............. | H04L 63/083 |
| 2013/0083926 A1* | 4/2013 | Hughes | ................ | H04L 9/3247 |
| | | | | 380/278 |
| 2017/0309135 A1* | 10/2017 | Beatty | ................ | G07G 1/0009 |

FOREIGN PATENT DOCUMENTS

| | | |
|---|---|---|
| CN | 108282329 A | 7/2018 |
| CN | 112152817 A | 12/2020 |

OTHER PUBLICATIONS

Dowling Benjamin et al: "Many a Mickle Makes a Muckle: A Framework for Provably Quantum-Secure Hybrid Key Exchange", Apr. 10, 2020 (Apr. 10, 2020), XP047547284, total 20 pages.

(Continued)

*Primary Examiner* — William J. Goodchild
(74) *Attorney, Agent, or Firm* — Slater Matsil, LLP

(57)         ABSTRACT

An application device sends a key request packet to a quantum device, where the key request packet includes a user identifier corresponding to the application device, a first public key, and a first message authentication code value. If verification performed on the first message authentication code value succeeds, the quantum device sends a key response packet to the application device, where the key response packet includes a first ciphertext and a second message authentication code value. If verification performed on the second message authentication code value succeeds, the application device decrypts the first ciphertext by using a first private key, to obtain quantum key information allocated by the quantum device to the application device. The first public key and the first private key are from a key pair obtained by the application device by running a post-quantum key generation algorithm.

23 Claims, 8 Drawing Sheets

(56)  References Cited

OTHER PUBLICATIONS

Menezes, A J; Van Oorschot, P C; Vanstone, S A, "Chapter 12: Key Establishment Protocols", Handbook of Applied Cryptography; [CRC Press Series on Discrete Mathematices and Its Applications], CRC Press, Boca Raton, FL, US, Oct. 1, 1996 (Oct. 1, 1996), XP001525012, total 54 pages.

Tatiana Bradley, "Opaque: The Best Passwords Never Leave your Device", https://blog.cloudflare.com/opaque-oblivious-passwords/, Dec. 8, 2020, total 20 pages.

Kumar, Manjit. "Quantum: Einstein, Bohr, and the Great Debate about the Nature of Reality", Reprint edition. W. W. Norton and Company, May 9, 2011, total 6 pages.

Quantum Secure Communication Technology White Paper, China Communications Standardization Association, Dec. 2018, total 129 pages, 200 pages including translation.

* cited by examiner

*300*

QUANTUM KEY TRANSMISSION METHOD, APPARATUS, AND SYSTEM

CROSS-REFERENCE TO RELATED APPLICATIONS

This application is a continuation of International Application No. PCT/CN2023/070073, filed on Jan. 3, 2023, which claims priority to Chinese Patent Application No. 202210132323.0, filed on Feb. 14, 2022, and Chinese Patent Application No. 202210187877.0, filed on Feb. 28, 2022. All of the aforementioned patent applications are hereby incorporated by reference in their entireties.

TECHNICAL FIELD

This application relates to the field of network technologies, and in particular, to a quantum key transmission method, an apparatus, and a system.

BACKGROUND

With development of quantum computers, a quantum attack poses a huge threat to a currently widely used cryptosystem. The quantum attack is an attack algorithm run on the quantum computer, and can crack currently widely used public key cryptographic algorithms such as an Rivest-Shamir-Adleman (RSA) algorithm and an elliptic curves cryptography (ECC) algorithm. The quantum computer is expected to be implemented in decades in the future. If an eavesdropper stores data encrypted by using a current encryption algorithm and then communicated through a network, after the quantum computer is implemented, the eavesdropper cracks, by using the quantum attack, the encryption algorithm used by the stored data, to obtain decrypted plaintext data. This is a huge threat to confidential information that needs to be stored for a long time. Therefore, it is urgent to design a cryptographic technology that can be used to resist the quantum attack.

Quantum key distribution (QKD) is a secure key distribution technology, and can implement secure transmission of a key between two communication ends remote from each other. Security of the quantum key distribution is ensured by a fundamental principle of quantum mechanics. Therefore, in a quantum network, transmission of a quantum key is unconditionally secure in theory.

However, when an application device that uses the quantum key and a quantum device that distributes the quantum key are deployed in different security domains, the quantum device can transmit the quantum key to the application device only through a classical network. Therefore, how to ensure security and reliability of transmission of the quantum key in the classical network is an urgent problem to be resolved currently.

SUMMARY

This application provides a quantum key transmission method, an apparatus, and a system, to implement secure transmission of a quantum key in a classical network.

According to a first aspect, a quantum key transmission method is provided. An application device sends a key request packet to a quantum device, where the key request packet includes a user identifier corresponding to the application device, a first public key, and a first message authentication code value, the user identifier is used by the quantum device to obtain corresponding storage information, the storage information includes a shared key corresponding to the quantum device and the user identifier, the first public key is used by the quantum device to encrypt quantum key information allocated to the application device, the quantum key information includes a quantum key, the first public key is a public key in a key pair obtained by the application device by running a post-quantum key generation algorithm, the first message authentication code value is obtained by the application device by calculating first authentication information based on the shared key, and the first authentication information includes the first public key. The application device receives, from the quantum device, a key response packet corresponding to the key request packet, where the key response packet includes a first ciphertext and a second message authentication code value. The application device verifies the second message authentication code value based on the shared key and second authentication information, where the second authentication information includes the first ciphertext. If the verification performed by the application device on the second message authentication code value succeeds, the application device decrypts the first ciphertext by using a first private key, to obtain the quantum key information, where the first private key is a private key in the key pair.

The user identifier indicates a service object. The service object is the application device or a user account for logging in to the application device. If it is determined that the key response packet received by the application device is from the quantum device and has not been tampered with, the first ciphertext is obtained by the quantum device by encrypting the quantum key information by using the first public key. A second message authentication code is obtained by the quantum device by calculating the second authentication information based on the shared key. The second authentication information includes the first ciphertext.

Because the first public key used by the quantum device to encrypt the quantum key information is obtained by the application device by running the post-quantum key generation algorithm, the quantum device encrypts the quantum key by using a post-quantum encryption algorithm, and then transmits the quantum key to the application device in a form of a ciphertext, to ensure transmission confidentiality of the quantum key. In addition, because the transmitted ciphertext is obtained through encryption by using the post-quantum encryption algorithm, a quantum attack can be resisted, to avoid a leakage that is of the quantum key and that is caused by cracking performed by a quantum computer on the ciphertext. The first message authentication code value can be used by the quantum device to perform identity authentication on the application device (that is, verify source reliability of the key request packet), and can be further used by the quantum device to perform message integrity verification on the key request packet. The second message authentication code value can be used by the application device to perform identity authentication on the quantum device (that is, verify source reliability of the key response packet), and can be further used by the application device to perform message integrity verification on the key response packet. Therefore, in this application, bidirectional identity authentication can be performed between the application device and the quantum device, the application device and the quantum device can further respectively perform message integrity verification on packets received by the application device and the quantum device, and transmission confidentiality of the quantum key is also ensured. In this way, security and reliability of transmission of the quantum key in a classical network are implemented. In addition, in a process in which the application device requests the quantum key from the quantum device, only one round of packet interaction is needed to complete transmission of the quantum key and identity authentication of the two parties, and an interaction process is simple.

Optionally, the user identifier corresponding to the application device is a device identifier of the application device. In this case, the shared key corresponding to the quantum device and the user identifier is a shared key between the quantum device and the application device. Alternatively, the user identifier corresponding to the application device is a user account for logging in to the application device. In this case, the shared key corresponding to the quantum device and the user identifier is a shared key between the quantum device and the user account.

Optionally, the key request packet further includes a first statistical value. Before the application device sends the key request packet to the quantum device, the application device obtains a historical sending count of the key request packet including the user identifier. The application device adds a specified increment value to the historical sending count, to obtain the first statistical value.

In this application, the first statistical value is carried in the key request packet sent by the application device, to assist a quantum device side in implementing replay attack detection.

Optionally, the key response packet further includes a second statistical value. The second statistical value is a sending count that is recorded by the quantum device and that is of the key request packet including the user identifier. After the application device receives the key response packet corresponding to the key request packet, if the second statistical value is not equal to the first statistical value, the application device stops a quantum key transmission procedure.

After the quantum device updates a stored statistical value based on the received key request packet, the recorded sending count of the key request packet should be equal to the sending count that is recorded by the application device and that is of the key request packet. Therefore, if the statistical value carried in the key response packet is not equal to the statistical value recorded by the application device, it indicates that the key response packet may be repeatedly sent by an attacker, that is, the key response packet may be a replay attack packet. In this way, replay attack detection on an application device side is implemented. Optionally, if the statistical value carried in the key response packet is not equal to the statistical value recorded by the application device, the application device further outputs an alarm prompt, where the alarm prompt indicates that a current key request is abnormal. This helps related personnel process an abnormal case in time.

Optionally, the first authentication information further includes one or more of a device identifier of the quantum device, the user identifier, or the first statistical value. More content included in authentication information indicates higher authentication reliability in theory.

Optionally, before the application device sends the key request packet to the quantum device, the application device generates a derived key based on a target password by using a key derivation function, where the shared key is obtained based on the derived key.

In this application, the target password is replaced with the derived key, to obtain the shared key. In this way, when the application device and the quantum device synchronize the shared key, the application device needs to send, to the quantum device, only the derived key obtained based on the target password. Even if the derived key is stolen in a transmission process or when being stored in the quantum device, a stealer cannot restore the target password used by the service object, so that the stealer can be prevented from forging the service object to request the quantum key from the quantum device.

Optionally, before the application device sends the key request packet to the quantum device, in response to obtaining of an entered quantum key obtaining instruction, the application device runs the post-quantum key generation algorithm to generate the key pair, where the quantum key obtaining instruction includes the target password. The application device calculates the first authentication information based on the shared key, to obtain the first message authentication code value.

In this application, each time the application device obtains the quantum key obtaining instruction, the application device runs the post-quantum key generation algorithm to generate a temporary key pair, so that each time the application device requests the quantum key, the quantum device performs encrypted protection on the quantum key information by using a public key temporarily generated by the application device, instead of performing encrypted protection on the quantum key information by using a private key of the quantum device. In this way, even if the private key used by the quantum device for a long time is leaked, quantum key information transferred between the quantum device and the application device in a previous communication process is not leaked. This ensures security of a quantum key obtained by the application device historically, thereby ensuring security of historical communication of the application device.

Optionally, before the application device sends the key request packet to the quantum device, the application device sends a registration request packet to the quantum device. The application device receives, from the quantum device, a registration response packet corresponding to the registration request packet, where the registration response packet includes a certificate of the quantum device, and the certificate includes a second public key. If verification performed by the application device on the certificate succeeds, the application device encrypts registration information by using the second public key, to obtain a second ciphertext, where the registration information includes the derived key and the user identifier. The application device sends a registration packet to the quantum device, where the registration packet includes the second ciphertext.

In this application, in a registration phase, identity authentication on the quantum device depends on the certificate, identity authentication on the application device depends on the derived key obtained based on the password, and the application device and the quantum device implement mutual identity authentication. In addition, encrypted transmission is performed on the registration information, and ensures transmission confidentiality of the registration information.

Optionally, the registration request packet indicates cryptographic algorithms supported by the application device. The registration response packet further indicates a target cryptographic algorithm selected by the quantum device from the cryptographic algorithms supported by the application device. The target cryptographic algorithm includes one or more of a generation algorithm of the first message authentication code value, a generation algorithm of the second message authentication code value, or a generation algorithm of the shared key.

Optionally, the registration response packet further includes a key derivation function parameter value. The key derivation function parameter value includes a random salt value and/or an iteration quantity. After the application device receives the registration response packet corresponding to the registration request packet, the application device obtains the user identifier and the target password. The application device generates the derived key based on the target password and the key derivation function parameter value by using the key derivation function.

Optionally, the registration packet further includes the device identifier of the application device. The registration information further includes a hash value of the device identifier of the application device.

In this application, the device identifier of the application device is carried in the registration packet sent by the application device, and the registration information includes the hash value of the device identifier of the application device, to assist the quantum device side in implementing message integrity verification on a packet sent by the application device to the quantum device.

Optionally, the registration information further includes a first random number generated by the application device. The application device receives a registration success response packet from the quantum device, where the registration success response packet indicates that the user identifier is successfully registered, and the registration success response packet includes a second random number. If the second random number is the same as the first random number, the application device determines that the user identifier is successfully registered.

If a packet communicated between the quantum device and the application device has not been tampered with, the first random number should be the same as the second random number. In this way, the application device can perform message integrity verification on a packet from the quantum device.

Optionally, an implementation in which the application device verifies the second message authentication code value based on the shared key and second authentication information includes: The application device calculates the second authentication information based on the shared key, to obtain a third message authentication code value. If the third message authentication code value is the same as the second message authentication code value, the application device determines that the verification on the second message authentication code value succeeds.

Optionally, the application device communicates with the quantum device through a classical network.

According to a second aspect, a quantum key transmission method is provided. A quantum device receives a key request packet from an application device, where the key request packet includes a user identifier corresponding to the application device, a first public key, and a first message authentication code value. The quantum device obtains, based on the key request packet, first authentication information and storage information that corresponds to the user identifier, where the storage information includes a shared key corresponding to the quantum device and the user identifier, and the first authentication information includes the first public key. The quantum device verifies the first message authentication code value based on the shared key and the first authentication information. If the verification performed by the quantum device on the first message authentication code value succeeds, the quantum device encrypts quantum key information by using the first public key, to obtain a first ciphertext, where the quantum key information includes a quantum key. The quantum device calculates second authentication information based on the shared key, to obtain a second message authentication code value, where the second authentication information includes the first ciphertext. The quantum device sends, to the application device, a key response packet corresponding to the key request packet, where the key response packet includes the first ciphertext and the second message authentication code value.

The user identifier indicates a service object. The service object is the application device or a user account for logging in to the application device. If it is determined that the key request packet received by the quantum device is from the application device and has not been tampered with, the first public key is a public key in a key pair obtained by the application device by running a post-quantum key generation algorithm. A first message authentication code is obtained by the application device by calculating first authentication information based on the shared key.

Optionally, the user identifier corresponding to the application device is a device identifier of the application device, or the user identifier corresponding to the application device is a user account for logging in to the application device.

Optionally, the key request packet further includes a first statistical value. The first statistical value is a sending count that is recorded by the application device and that is of the key request packet including the user identifier. The storage information corresponding to the user identifier includes a second statistical value. The second statistical value is a sending count that is recorded by the quantum device and that is of the key request packet including the user identifier. After the quantum device obtains the storage information that corresponds to the user identifier, if the second statistical value is greater than or equal to the first statistical value, the quantum device stops a quantum key transmission procedure; or if the second statistical value is less than the first statistical value, the quantum device updates the second statistical value, to enable an updated second statistical value to be equal to the first statistical value.

Before the quantum device updates a stored statistical value based on the received key request packet, the recorded sending count of the key request packet should be less than the sending count that is recorded by the application device and that is of the key request packet. Therefore, if the first statistical value carried in the key request packet is less than or equal to the second statistical value stored by the quantum device, it indicates that the key request packet may be repeatedly sent by an attacker, that is, the key request packet may be a replay attack packet. In this way, replay attack detection on a quantum device side is implemented. Optionally, if the second statistical value is greater than or equal to the first statistical value, the quantum device further outputs an alarm prompt, where the alarm prompt indicates that a current key request is abnormal. This helps related personnel process an abnormal case in time.

Optionally, the key response packet further includes the updated second statistical value.

In this application, the updated second statistical value is carried in the key response packet sent by the quantum device, to assist the application device side in implementing replay attack detection.

Optionally, the second authentication information further includes one or more of a device identifier of the quantum device, the user identifier, or the updated second statistical value.

Optionally, the quantum device receives a registration request packet from the application device. The quantum device sends a registration response packet to the application device, where the registration response packet includes a certificate of the quantum device, the certificate includes a second public key, and the second public key is a public key in a key pair obtained by the quantum device by running a post-quantum key generation algorithm. If the quantum device receives, from the application device, a registration packet including a second ciphertext, the quantum device decrypts the second ciphertext by using a second private key, to obtain registration information, where the registration information includes a derived key and the user identifier that corresponds to the application device, and the second private key is a private key in the key pair. The quantum device stores the storage information corresponding to the user identifier, where the storage information includes the user identifier and the shared key that is obtained based on the derived key.

In this application, because the second public key used by the application device to encrypt the registration information is obtained by the quantum device by running the post-quantum key generation algorithm, the application device encrypts the registration information by using a post-quantum encryption algorithm, and then transmits the registration information to the quantum device in a form of a ciphertext, to ensure transmission confidentiality of the registration information. In addition, because the second ciphertext is obtained through encryption by using the post-quantum encryption algorithm, a quantum attack can be resisted, to avoid a leakage that is of the registration information and that is caused by cracking performed by a quantum computer on the second ciphertext.

Optionally, the registration request packet indicates cryptographic algorithms supported by the application device. The registration response packet further indicates a target cryptographic algorithm selected by the quantum device from the cryptographic algorithms supported by the application device. The target cryptographic algorithm includes one or more of a generation algorithm of the first message authentication code value, a generation algorithm of the second message authentication code value, or a generation algorithm of the shared key.

Optionally, the registration response packet further includes a first key derivation function parameter value. The first key derivation function parameter value includes a random salt value and/or an iteration quantity. The registration information further includes a second key derivation function parameter value. After the quantum device decrypts the second ciphertext by using the second private key, to obtain the registration information, the quantum device compares the first key derivation function parameter value with the second key derivation function parameter value. If the first key derivation function parameter value is the same as the second key derivation function parameter value, the quantum device stores the storage information corresponding to the user identifier.

Because the second key derivation function parameter value carried in the registration packet by the application device is from the first key derivation function parameter value in the registration response packet received by the application device, the first key derivation function parameter value should be the same as the second key derivation function parameter value. If the quantum device finds, after receiving the registration packet, that the second key derivation function parameter value carried in the registration packet from the application device is different from the first key derivation function parameter value carried in the registration response packet sent by the quantum device, it indicates that the registration packet and/or the registration response packet have/has been tampered with in a transmission process. In this application, the quantum device compares the first key derivation function parameter value with the second key derivation function parameter value, so that message integrity verification on bidirectionally communicated packets between the quantum device and the application device can be implemented.

Optionally, the registration packet further includes the device identifier of the application device. The registration information further includes a first hash value of the device identifier of the application device. After the quantum device decrypts the second ciphertext by using a second private key, to obtain registration information, the quantum device calculates a second hash value of the device identifier of the application device. The quantum device compares the first hash value with the second hash value. If the first hash value is the same as the second hash value, the quantum device stores the storage information corresponding to the user identifier.

If the first hash value carried in the registration packet received by the quantum device is different from the second hash value obtained by the quantum device through calculation, it indicates that the registration packet has been tampered with in a transmission process. In this application, the quantum device compares the first hash value with the second hash value, so that message integrity verification on a packet sent by the application device to the quantum device can be implemented.

Optionally, the registration information further includes a random number generated by the application device. After the quantum device stores the storage information corresponding to the user identifier, the quantum device sends a registration success response packet to the application device, where the registration success response packet indicates that the user identifier is successfully registered, and the registration success response packet includes the random number.

In this application, the random number in the registration information is carried in the registration success response packet sent by the quantum device, to assist the application device in implementing message integrity verification on a packet from the quantum device.

Optionally, an implementation in which the quantum device verifies the first message authentication code value based on the shared key and the first authentication information includes: The quantum device calculates the first authentication information based on the shared key, to obtain a fourth message authentication code value. If the fourth message authentication code value is the same as the first message authentication code value, the quantum device determines that the verification on the first message authentication code value succeeds.

Optionally, the application device communicates with the quantum device through a classical network.

According to a third aspect, an application device is provided. The application device includes a plurality of function modules. The plurality of function modules interact with each other to implement the method in the first aspect and the implementations of the first aspect. The plurality of function modules may be implemented based on software, hardware, or a combination of the software and the hardware, and the plurality of function modules may be randomly combined or divided based on specific implementation.

According to a fourth aspect, a quantum device is provided. The quantum device includes a plurality of function modules. The plurality of function modules interact with each other to implement the method in the second aspect and the implementations of the second aspect. The plurality of function modules may be implemented based on software, hardware, or a combination of the software and the hardware, and the plurality of function modules may be randomly combined or divided based on specific implementation.

According to a fifth aspect, an application device is provided, and includes a memory, a network interface, and at least one processor. The memory is configured to store program instructions. After the at least one processor reads the program instructions stored in the memory, the application device is enabled to perform the method in the first aspect and the implementations of the first aspect.

According to a sixth aspect, a quantum device is provided, and includes a memory, a network interface, and at least one processor. The memory is configured to store program instructions. After the at least one processor reads the program instructions stored in the memory, the quantum device is enabled to perform the method in the second aspect and the implementations of the second aspect.

According to a seventh aspect, a quantum key transmission system is provided, and includes an application device and a quantum device. The application device is configured to perform the method in the first aspect and the implementations of the first aspect. The quantum device is configured to perform the method in the second aspect and the implementations of the second aspect.

According to an eighth aspect, a quantum key transmission system is provided, and includes a first application device and a first quantum device. The first application device is configured to send a key request packet to the first quantum device, where the key request packet includes a user identifier corresponding to the first application device, a first public key, and a first message authentication code value, the first public key is a public key in a key pair obtained by the first application device by running a post-quantum key generation algorithm, the first message authentication code value is obtained by the first application device by calculating first authentication information based on a shared key corresponding to the quantum device and the user identifier, and the first authentication information includes the first public key. The first quantum device is configured to obtain, based on the key request packet, the first authentication information and storage information that corresponds to the user identifier, where the storage information includes the shared key. The first quantum device is configured to verify the first message authentication code value based on the shared key and the first authentication information. If the verification performed by the first quantum device on the first message authentication code value succeeds, the first quantum device is configured to encrypt quantum key information by using the first public key, to obtain a first ciphertext, where the quantum key information includes a quantum key. The first quantum device is configured to calculate second authentication information based on the shared key, to obtain a second message authentication code value, where the second authentication information includes the first ciphertext. The first quantum device is configured to send, to the first application device, a key response packet corresponding to the key request packet, where the key response packet includes the first ciphertext and the second message authentication code value. The first application device is configured to obtain the second authentication information based on the key response packet. The first application device is configured to verify the second message authentication code value based on the shared key and the second authentication information. If the verification performed by the first application device on the second message authentication code value succeeds, the first application device is configured to decrypt the first ciphertext by using a first private key, to obtain the quantum key information, where the first private key is a private key in the key pair.

Optionally, the quantum key information further includes a key identifier of the quantum key, and the system further includes a second application device and a second quantum device, where the first quantum device is further configured to send the quantum key information to the second quantum device; the first application device is further configured to send the key identifier to the second application device; the second application device is configured to send a key obtaining request to the second quantum device, where the key obtaining request includes the key identifier; the second quantum device is configured to send the quantum key to the second application device based on the key identifier; and the first application device and the second application device are configured to perform communication based on the quantum key.

Optionally, the first quantum device communicates with the second quantum device through a quantum network, the first quantum device communicates with the first application device through a classical network, the second quantum device communicates with the second application device through the classical network, and the first application device communicates with the second application device through the classical network.

According to a ninth aspect, a computer-readable storage medium is provided. The computer-readable storage medium stores instructions. When the instructions are executed by a processor of an application device, the method in the first aspect and the implementations of the first aspect is implemented; or when the instructions are executed by a processor of a quantum device, the method in the second aspect and the implementations of the second aspect is implemented.

According to a tenth aspect, a computer program product is provided, and includes a computer program. When the computer program is executed by a processor of an application device, the method in the first aspect and the implementations of the first aspect is implemented; or when the computer program is executed by a processor of a quantum device, the method in the second aspect and the implementations of the second aspect is implemented.

According to an eleventh aspect, a chip is provided. The chip includes a programmable logic circuit and/or program instructions. When the chip is run, the method in the first aspect and the implementations of the first aspect or the method in the second aspect and the implementations of the second aspect is implemented.

DETAILED DESCRIPTION OF ILLUSTRATIVE EMBODIMENTS

Figure 1:
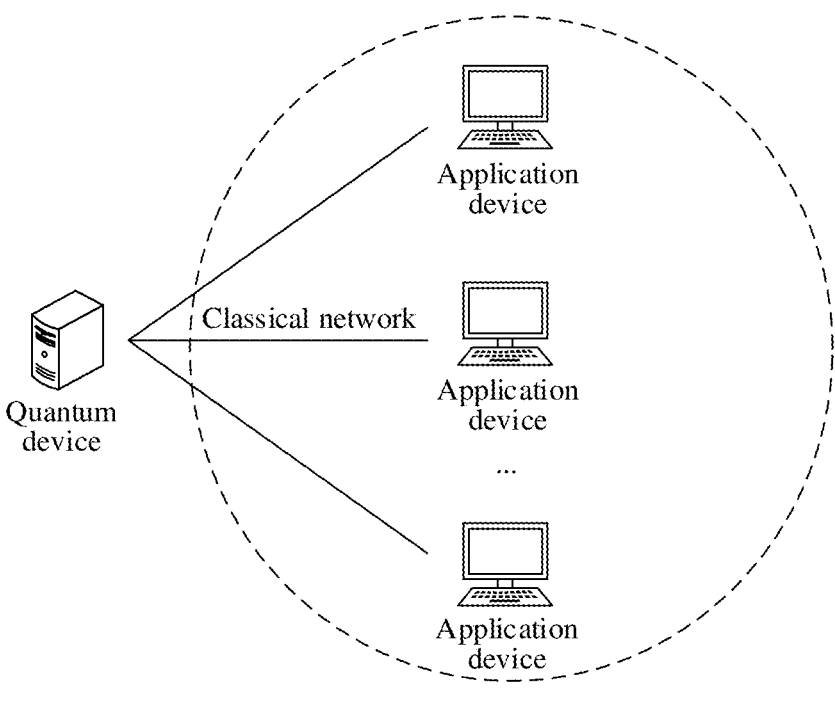
FIG. 1 is a schematic diagram of an application scenario according to an embodiment of this application.

To make objectives, technical solutions, and advantages of this application clearer, the following further describes the implementations of this application in detail with reference to the accompanying drawings.

For ease of understanding of the solutions in this application by a reader, the following first explains some terms.

1. Classical computer: is a physical apparatus that stores and processes data in binary (0 or 1). An application device in this application belongs to the classical computer.

2. Quantum computer: is a physical apparatus that processes information based on a quantum computing principle by following a quantum mechanics law. The quantum computer stores and processes the data by using a quantum bit. The quantum bit has more states than the binary. The quantum computer has a capability of the classical computer. The quantum computer can more efficiently solve some problems that it is difficult for the classical computer to solve. A quantum device in this application belongs to the quantum computer.

3. Classical network: is a communication network including the classical computer.

4. Quantum network: is a new-type secure communication network. The quantum network uses quantum entanglement and quantum teleportation to bring true security to a network and make a qualitative leap in the computing and scientific fields. That communication nodes communicate with each other through the quantum network may be understood as follows: The communication nodes share a quantum key between the communication nodes by using a quantum key distribution technology, and communicate with each other based on the quantum key. In a quantum key distribution process, the quantum key is communicated in a form of a quantum state. Because a quantum communication line cannot bypass eavesdropping or intercept eavesdropping by hooking up, as long as the quantum communication line is eavesdropped, the quantum state changes to change communication content, to prevent an original text from being detected. Therefore, secure transmission of the quantum key can be implemented. Quantum computers can communicate with each other through the quantum network.

5. Quantum attack: is an attack algorithm run on the quantum computer, for example, an algorithm that can efficiently crack some passwords, such as a Shor's algorithm (Shor's algorithm) and a Grover algorithm.

6. Quantum key distribution (QKD): is a secure key distribution technology implemented by using a Heisenberg uncertainty principle and a quantum state no-cloning theorem in quantum mechanics. In the quantum key distribution process, one quantum device generates the quantum key, and transmits the quantum key to the other quantum device through the quantum network. In this way, a shared quantum key is formed between the two quantum devices.

7. Asymmetric cryptographic algorithm: is an algorithm in which a sender and receiver use different keys for encryption and decryption, and is also referred to as a public key cryptographic algorithm. In an asymmetric cryptographic technology, there is a pair of keys: a private key and a public key. The private key is stored secretly by a key-pair owner, and cannot be disclosed. The public key is published by a key-pair owner to others. Data encrypted by using the public key can be decrypted only by using the corresponding private key. Signature verification can also be performed, only by using the corresponding public key, on data signed by using the private key. Currently, common asymmetric cryptographic algorithms include an RSA algorithm and an ECC algorithm.

8. Post-quantum cryptography (PQC) system: is a public-key cryptography system that includes a key generation algorithm, an encryption algorithm, and a decryption algorithm. The algorithms included in the post-quantum cryptography system are collectively referred to as a post-quantum cryptographic algorithm. The post-quantum cryptographic algorithm is an asymmetric cryptographic algorithm that can be run on the classical computer. The post-quantum cryptographic algorithm has quantum resistance, that is, can resist the quantum attack, and cannot be cracked by the quantum computer. The quantum resistance of the post-quantum cryptographic algorithm does not depend on the quantum mechanics, but is implemented based on a mathematical puzzle that cannot be cracked by the quantum computer currently. The post-quantum cryptographic algorithm includes a lattice-based algorithm, a coding-based algorithm, an isogeny-based algorithm, a multivariate-based algorithm, or an algorithm implemented based on another subdivision type.

9. Digital signature (signature for short): is a means of protecting data of the sender. The sender signs a message by using the private key. No third party without the private key can forge a signature. Any third party that has the public key corresponding to the private key held by the sender can verify the signature to determine a source and integrity of the message.

10. Signature verification: After receiving the data, the receiver verifies the signature by using the public key, and outputs a Boolean value indicating that the signature is valid (where the signature verification succeeds) or invalid (where the signature verification fails). If the signature verification succeeds, it indicates that the data has not been tampered with. If the signature verification fails, it indicates that the data has been tampered with. The signature verification can be for verifying data integrity (not tampered with) and data source reliability (not fake data or forged data).

11. Digital certificate (certificate for short): is an identity card of a device, a user, or an application in a digital world. The certificate contains applicant information and a signature of a certificate authority (CA) on the applicant information. The applicant information includes a public key in a key pair held by an applicant. Optionally, the applicant information further includes identity information of the applicant. For example, the applicant is a device, and the identity information of the applicant is a device identifier that can uniquely identify the device. Optionally, a device identifier of a device includes but is not limited to one or more of a device serial number, a media access control (MAC) address of the device, or an internet protocol (IP) address of the device. After receiving the certificate from the sender, the receiver performs signature verification on the certificate by using a public key (which is also referred to as a root CA certificate) in a "unified key pair" of the certificate authority, so that whether a public key in the certificate is from the sender can be determined.

12. Message authentication code (MAC): is for verifying message integrity (not tampered with) and message source reliability (not fake message or forged message). An authentication principle of the message authentication code is as follows: The sender and the receiver negotiate a shared key in advance. The sender generates a MAC value of a message of any length by using the shared key, and then transmits the message and the MAC value to the receiver. The receiver generates a MAC value of the message by using the shared key, and compares the MAC value generated by the receiver with the MAC value received from the sender. If the MAC values are the same, the receiver determines that the message is indeed from the sender and has not been tampered with (where the verification succeeds). If the MAC values are different, the receiver may determine that the message is not from the sender or has been tampered with in a transmission process (where the verification fails).

A quantum key is generated and distributed by a quantum device. When an application device and the quantum device are deployed in different security domains, if the application device needs to use the quantum key, the quantum key needs to be transmitted from the quantum device to the application device through a classical network. In this case, to enable the application device to securely communicate based on the quantum key, a "last mile" problem of quantum key transmission first needs to be resolved. That is, security and reliability of transmission of the quantum key in the classical network first need to be ensured. To ensure the security and the reliability of the transmission of the quantum key in the classical network, the following three problems need to be resolved:

First, an identity authentication problem. The quantum key needs to be transferred to a correct target user, and the target user needs to determine a correct source of the quantum key. Therefore, the quantum device and the application device need to be able to perform identity authentication on each other, to resist a spoofing attack in an interaction process. The spoofing attack includes, for example, that a malicious application device pretends to be a legal application device to interact with the quantum device to steal the quantum key.

Second, a transmission confidentiality problem. The quantum key needs to be communicated in a form of a ciphertext in the classical network. Therefore, the quantum device needs to perform encrypted protection on the quantum key by using an encryption algorithm. In addition, the selected encryption algorithm needs to have quantum resistance, to avoid a leakage that is of the quantum key and that is caused by cracking performed by a quantum computer on the encryption algorithm.

Third, a message integrity problem. Both the application device and the quantum device need to ensure that a received message has not been tampered with. Therefore, both the quantum device and the application device need to be able to perform message integrity verification on content of a received packet.

Based on this, this application provides a technical solution to quantum key transmission. An application device and a quantum device cooperate to implement this technical solution. The application device sends a key request packet to the quantum device, where the key request packet includes a user identifier corresponding to the application device, a first public key, and a first message authentication code value. If verification performed by the quantum device on the first message authentication code value succeeds, the quantum device sends a key response packet to the application device, where the key response packet includes a first ciphertext and a second message authentication code value. If verification performed by the application device on the second message authentication code value succeeds, the application device decrypts the first ciphertext by using a first private key, to obtain quantum key information allocated by the quantum device to the application device.

The first public key and the first private key are from a key pair obtained by the application device by running a post-quantum key generation algorithm. The first ciphertext is obtained by the quantum device by encrypting, by using the first public key, the quantum key information allocated to the application device. The quantum key information includes a quantum key. Because the first public key used by the quantum device to encrypt the quantum key information is obtained by the application device by running the post-quantum key generation algorithm, the quantum device encrypts the quantum key by using a post-quantum encryption algorithm, and then transmits the quantum key to the application device in a form of a ciphertext, to ensure transmission confidentiality of the quantum key. In addition, because the transmitted ciphertext is obtained through encryption by using the post-quantum encryption algorithm, a quantum attack can be resisted, to avoid a leakage that is of the quantum key and that is caused by cracking performed by a quantum computer on the ciphertext.

The first message authentication code value is obtained by the application device by calculating first authentication information based on a shared key corresponding to the quantum device and the user identifier, and the first authentication information includes the first public key. After receiving the key request packet from the application device, the quantum device obtains, based on the key request packet, the first authentication information and storage information that corresponds to the user identifier in the key request packet, where the storage information includes the shared key corresponding to the quantum device and the user identifier. Then, the quantum device verifies the first message authentication code value based on the obtained shared key and first authentication information. If the verification performed by the quantum device on the first message authentication code value succeeds, it indicates that the key request packet is from the other party that holds the shared key and that content (including the first public key) carried in the key request packet in the first authentication information has not been tampered with in a transmission process. Therefore, the first message authentication code value can be used by the quantum device to perform identity authentication on the application device (that is, verify source reliability of the key request packet), and can be further used by the quantum device to perform message integrity verification on the key request packet.

The second message authentication code value is obtained by the quantum device by calculating second authentication information based on the shared key corresponding to the quantum device and the user identifier, and the second authentication information includes the first ciphertext. After receiving the key response packet from the quantum device, the application device obtains the second authentication information based on the key response packet. Then, the application device verifies the second message authentication code value based on the second authentication information and the shared key that corresponds to the quantum device and the user identifier. If the verification performed by the application device on the second message authentication code value succeeds, it indicates that the key response packet is from the other party that holds the shared key and that content (including the first ciphertext) carried in the key response packet in the second authentication information has not been tampered with in a transmission process. Therefore, the second message authentication code value can be used by the application device to perform identity authentication on the quantum device (that is, verify source reliability of the key response packet), and can be further used by the application device to perform message integrity verification on the key response packet.

Based on the foregoing descriptions, it can be learned that the quantum key is communicated by implementing this technical solution, so that bidirectional identity authentication can be performed between the application device and the quantum device, the application device and the quantum device can further respectively perform message integrity verification on packets received by the application device and the quantum device, and the transmission confidentiality of the quantum key is also ensured. In this way, security and reliability of transmission of the quantum key in a classical network are implemented.

There are two implementation scenarios of a quantum key transmission method provided in embodiments of this application. In one implementation scenario, a specific application device is used as a service object, and the quantum device is configured to allocate the quantum key to the application device. In this implementation scenario, the user identifier corresponding to the application device is a device identifier of the application device. The shared key corresponding to the quantum device and the user identifier is a shared key between the quantum device and the specific application device. That is, one party that holds the shared key is the quantum device, and the other party is the specific application device. In the other implementation scenario, a user account is used as a service object, and the quantum device is configured to allocate the quantum key to an application device to which the user account is for logging in. In this implementation scenario, the user identifier corresponding to the application device is a user account for logging in to the application device. The shared key corresponding to the quantum device and the user identifier is a shared key between the quantum device and the user account. One party that holds the shared key is the quantum device, and the other party is any application device to which the user account is for logging in.

The following describes this technical solution in detail from a plurality of perspectives such as an application scenario, a method procedure, a function module, a system, a hardware apparatus, and a software apparatus.

The following describes the application scenario of embodiments of this application by using an example.

For example, FIG. 1 is a schematic diagram of an application scenario according to an embodiment of this application. As shown in FIG. 1, the application scenario mainly involves two types of devices: application devices and a quantum device. Optionally, one quantum device is configured to provide a quantum service for one or more application devices. That is, the quantum device can allocate a quantum key to the one or more application devices. Optionally, the quantum device and the application device communicate with each other through a classical network. For example, the quantum device and the application device communicate with each other based on a Transmission Control Protocol/Internet Protocol (TCP/IP).

Optionally, the application device includes but is not limited to a network device such as a router, a switch, or a firewall. Alternatively, the application device is a terminal device such as a computer, a mobile phone, or an internet of things (IoT) terminal. Alternatively, the application device is another device that has a communication requirement, for example, a server or a cloud platform. The quantum device is a quantum computer that can generate or store the quantum key. The quantum device in embodiments of this application may also be referred to as a quantum key distribution device.

The following describes the method procedure in embodiments of this application by using an example.

Figure 2:
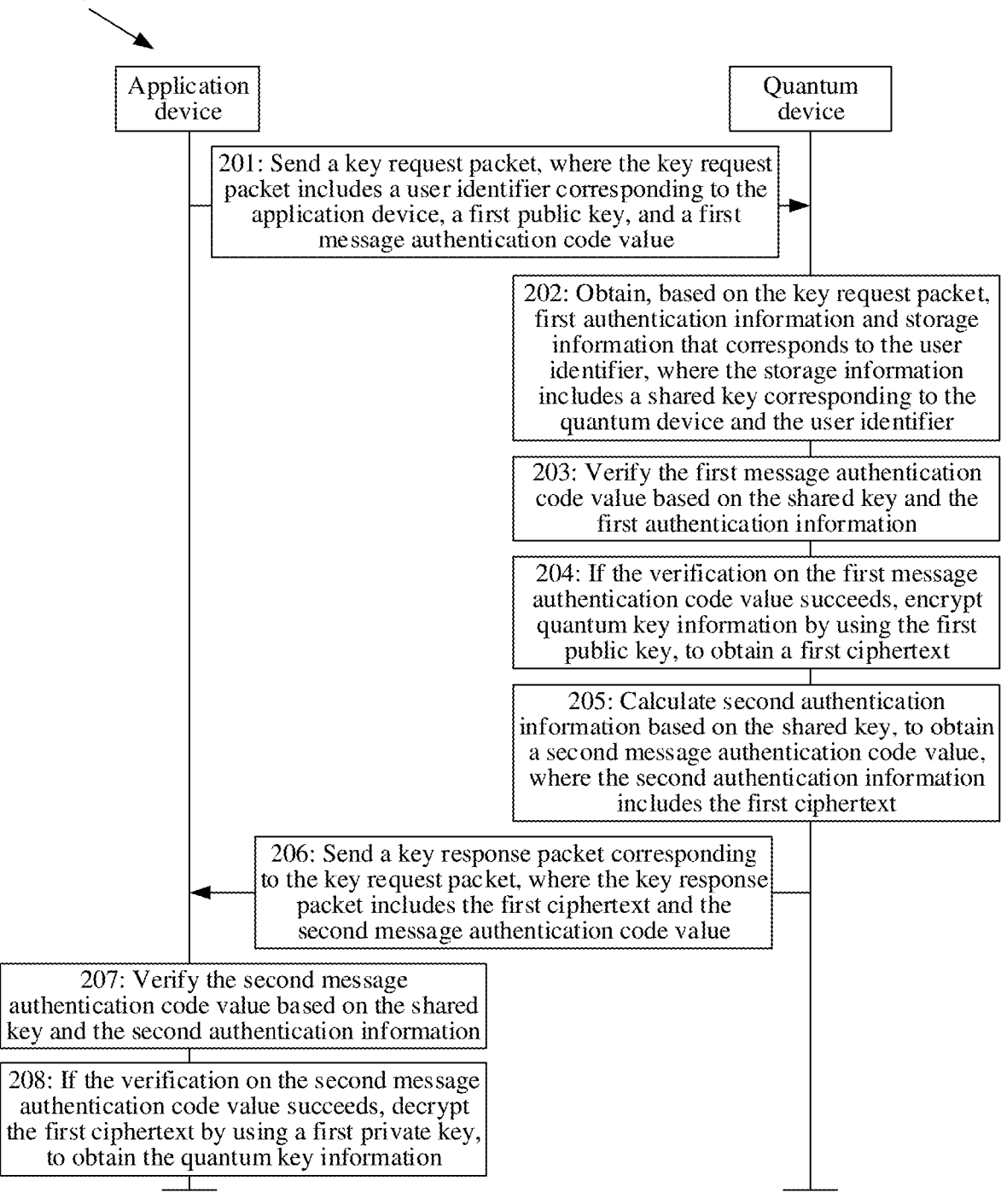
FIG. 2 is a schematic diagram of an implementation procedure of a quantum key transmission method according to an embodiment of this application.

For example, FIG. 2 is a schematic diagram of an implementation procedure of a quantum key transmission method 200 according to an embodiment of this application. As shown in FIG. 2, the method 200 includes step 201 to step 208. Optionally, a quantum device in the method 200 is the quantum device in FIG. 1. An application device in the method 200 is any application device in FIG. 1.

Step 201: The application device sends a key request packet to the quantum device, where the key request packet includes a user identifier corresponding to the application device, a first public key, and a first message authentication code value.

The user identifier corresponding to the application device in the key request packet indicates a service object of the quantum device, so that the quantum device can obtain storage information corresponding to the service object. That is, the user identifier corresponding to the application device is used by the quantum device to obtain the corresponding storage information. The storage information includes a shared key corresponding to the quantum device and the user identifier. Optionally, if the user identifier corresponding to the application device is a device identifier of the application device, the shared key corresponding to the quantum device and the user identifier is a shared key between the quantum device and the application device. In this case, the shared key is stored in the application device in advance, and the application device can directly obtain the stored shared key. Alternatively, if the user identifier corresponding to the application device is a user account for logging in to the application device, the shared key corresponding to the quantum device and the user identifier is a shared key between the quantum device and the user account. In this case, the shared key is bound to the user account. After the user account is for logging in to the application device, the application device can obtain the shared key bound to the user account.

The first public key in the key request packet is used by the quantum device to encrypt quantum key information allocated to the application device that sends the key request packet. The quantum key information includes a quantum key. Optionally, the quantum key information further includes a key identifier of the quantum key. In this embodiment of this application, a private key corresponding to the first public key is referred to as a first private key. The first public key and the first private key are respectively a public key and a private key in a key pair obtained by the application device by running a post-quantum key generation algorithm.

The first message authentication code value in the key request packet is obtained by the application device by calculating first authentication information based on the shared key corresponding to the quantum device and the user identifier. The first authentication information includes the first public key. Optionally, the first authentication information further includes a device identifier of the quantum device and/or the user identifier carried in the key request packet. The first message authentication code value is used by the quantum device to perform identity authentication on the application device and perform message integrity authentication on the key request packet.

Optionally, one quantum device is configured to allocate the quantum key to one or more service objects. Different service objects use different passwords for the quantum device to perform identity authentication. Optionally, the shared key corresponding to the quantum device and the user identifier is obtained based on a target password, and the target password is a password used by the service object indicated by the user identifier.

Optionally, before step 201 is performed, in response to obtaining of an entered quantum key obtaining instruction, the application device runs the post-quantum key generation algorithm to generate the key pair. The quantum key obtaining instruction includes the target password. Then, the application device calculates, based on the shared key, the first authentication information including the first public key, to obtain the first message authentication code value. For example, when a user enters the target password on the application device, the application device determines that the quantum key obtaining instruction is obtained. Optionally, when a quantity of times of entering an incorrect password on the application device reaches a preset threshold of times, the application device locks a password entering screen. In this embodiment of this application, the quantity of times of entering the incorrect password is limited to limit a trial-and-error quantity of an attacker, so that an online dictionary attack can be resisted.

Optionally, the first message authentication code value is a hash message authentication code (HMAC) value.

In this embodiment of this application, each time the application device obtains the quantum key obtaining instruction, the application device runs the post-quantum key generation algorithm to generate a temporary key pair, so that each time the application device requests the quantum key, the quantum device performs encrypted protection on the quantum key information by using a public key temporarily generated by the application device, instead of performing encrypted protection on the quantum key information by using a private key of the quantum device. In this way, even if the private key used by the quantum device for a long time is leaked, quantum key information transferred between the quantum device and the application device in a previous communication process is not leaked. This ensures security of a quantum key obtained by the application device historically, thereby ensuring security of historical communication of the application device.

Alternatively, the application device uses a fixed key pair when requesting the quantum key. In this way, the application device does not need to generate a key pair after obtaining the quantum key obtaining instruction, so that efficiency of obtaining the quantum key by the application device can be improved. For example, when the service object is the application device, the application device generates and stores a key pair in advance; and in response to obtaining of the quantum key obtaining instruction, the application device directly obtains a public key from the stored key pair, and obtains a message authentication code value through calculation. When the service object is the user account, the user account is bound to a key pair in advance; and in response to obtaining of the quantum key obtaining instruction, the application device to which the user account is logging in directly obtains a public key from the key pair bound to the user account, and obtains a message authentication code value through calculation.

Optionally, before step 201 is performed, the application device generates a derived key based on the target password by using a key derivation function (KDF). The key derivation function is for inferring one or more keys from a secret value by using a pseudorandom function. The secret value is an original key, and the inferred key is the derived key. For example, use of the key derivation function is expressed as: DK=KDF (Key, Salt, and Iterations). DK is the derived key. KDF is the key derivation function. Key is the original key. Salt is a random number. Iterations indicate an iteration quantity. The random salt value and the iteration quantity may be collectively referred to as a key derivation function parameter value. In this embodiment of this application, the target password is used as a part or all of the original key used for the key derivation function. The shared key corresponding to the quantum device and the user identifier is obtained based on the derived key. Optionally, that the shared key is obtained based on the derived key includes: The shared key is the derived key, or the shared key is a hash value of the derived key.

In this embodiment of this application, the target password is replaced with the derived key, to obtain the shared key. In this way, when the application device and the quantum device synchronize the shared key, the application device needs to send, to the quantum device, only the derived key obtained based on the target password. Even if the derived key is stolen in a transmission process or when being stored in the quantum device, a stealer cannot restore the target password used by the service object, so that the stealer can be prevented from forging the service object to request the quantum key from the quantum device.

Optionally, the key derivation function used by the application device includes but is not limited to a hash function or a password-based key derivation function 2 (PBKDF2). For example, if the application device uses the PBKDF2 as the key derivation function, the target password is denoted as pwd, the random salt value is denoted as salt, and the iteration quantity is denoted as i, a derived key UK obtained based on the target password satisfies: UK=PBKDF2 (pwd-∥secret, salt, and i). "Secret" is a secret generated and maintained by the application device. The symbol "∥" in this embodiment of this application represents concatenation. The application device uses both pwd and secret as the original key to generate the derived key. In this way, a possibility of obtaining the target password through restoring based on cracking of the derived key can be reduced, and an offline dictionary attack can be resisted to some extent, so that confidentiality and use security of the target password are further improved.

Step 202: After receiving the key request packet from the application device, the quantum device obtains, based on the key request packet, first authentication information and storage information that corresponds to the user identifier, where the storage information includes the shared key corresponding to the quantum device and the user identifier.

That the quantum device obtains the first authentication information based on the key request packet includes: The quantum device obtains the first public key from the key request packet. Optionally, the quantum device stores storage information corresponding to one or more user identifiers. Storage information corresponding to each user identifier includes the user identifier and a shared key that corresponds to the quantum device and the user identifier. That the quantum device obtains, based on the key request packet, the storage information that corresponds to the user identifier is that the quantum device obtains the storage information corresponding to the user identifier carried in the key request packet.

Step 203: The quantum device verifies the first message authentication code value based on the shared key and the first authentication information.

The first authentication information in step 203 is the authentication information obtained by the quantum device based on the received key request packet in step 202. If the key request packet sent by the application device in step 201 has not been tampered with in a transmission process, content of the first authentication information obtained by the quantum device in step 202 is consistent with content of the first authentication information used by the application device to calculate the first message authentication code value in step 201. Optionally, an implementation of step 203 is as follows: The quantum device calculates the first authentication information based on the shared key, to obtain a fourth message authentication code value. If the fourth message authentication code value is the same as the first message authentication code value, the quantum device determines that the verification on the first message authentication code value succeeds. If the fourth message authentication code value is different from the first message authentication code value, the quantum device determines that the verification on the first message authentication code value fails.

If the verification performed by the quantum device on the first message authentication code value succeeds, it indicates that the key request packet received by the quantum device is from the other party that holds the shared key and that content (including at least the first public key) carried in the key request packet in the first authentication information has not been tampered with in the transmission process. In this case, the quantum device provides the quantum key for a requester. If the verification performed by the quantum device on the first message authentication code value fails, it indicates that the key request packet received by the quantum device is not from the other party that holds the shared key or that content carried in the key request packet in the first authentication information has been tampered with in the transmission process. In this case, the quantum device does not provide the quantum key for the requester. In this embodiment of this application, the first message authentication code value is carried in the key request packet sent by the application device, so that the quantum device can perform identity authentication on the application device (that is, verify source reliability of the key request packet) and perform message integrity verification on the key request packet.

Step 204: If the verification performed by the quantum device on the first message authentication code value succeeds, the quantum device encrypts the quantum key information by using the first public key, to obtain a first ciphertext.

The quantum key information includes the quantum key. Optionally, the quantum key information further includes a key identifier of the quantum key.

Because the first public key used by the quantum device to encrypt the quantum key information is obtained by the application device by running the post-quantum key generation algorithm, the quantum device encrypts the quantum key by using a post-quantum encryption algorithm, and then transmits the quantum key to the application device in a form of a ciphertext, to ensure transmission confidentiality of the quantum key. In addition, because the first ciphertext is obtained through encryption by using the post-quantum encryption algorithm, a quantum attack can be resisted, to avoid a leakage that is of the quantum key and that is caused by cracking performed by a quantum computer on the first ciphertext.

Optionally, after determining the quantum key information allocated to the application device, the quantum device adds the quantum key information to the storage information corresponding to the user identifier corresponding to the application device, so that when another application device needs to communicate with the application device based on the quantum key, the quantum device can directly or indirectly provide the another application device with the quantum key used by the application device, to implement secure communication between the application devices.

Step 205: The quantum device calculates second authentication information based on the shared key, to obtain a second message authentication code value, where the second authentication information includes the first ciphertext.

Optionally, the second authentication information further includes the device identifier of the quantum device and/or the user identifier carried in the key request packet. Optionally, the second message authentication code value is a hash message authentication code (HMAC) value.

Step 206: The quantum device sends, to the application device, a key response packet corresponding to the key request packet, where the key response packet includes the first ciphertext and the second message authentication code value.

Step 207: After receiving the key response packet from the quantum device, the application device verifies the second message authentication code value based on the shared key and second authentication information.

The second authentication information in step 207 is authentication information obtained by the application device based on the received key response packet. If the key response packet sent by the quantum device in step 206 has not been tampered with in a transmission process, content of the authentication information obtained by the application device based on the key response packet is consistent with content of the second authentication information used by the application device to calculate the second message authentication code value in step 205. Optionally, an implementation of step 207 is as follows: The application device calculates the second authentication information based on the shared key, to obtain a third message authentication code value. If the third message authentication code value is the same as the second message authentication code value, the application device determines that the verification on the second message authentication code value succeeds. If the third message authentication code value is different from the second message authentication code value, the application device determines that the verification on the second message authentication code value fails.

If the verification performed by the application device on the second message authentication code value succeeds, it indicates that the key response packet received by the application device is from the other party that holds the shared key and that content (including at least the first ciphertext) carried in the key response packet in the second authentication information has not been tampered with in the transmission process. In this case, it indicates that the quantum key information carried in the key response packet is reliable, and the application device further extracts the quantum key information carried in the key response packet. If the verification performed by the application device on the second message authentication code value fails, it indicates that the key response packet received by the application device is not from the other party that holds the shared key or that content carried in the key response packet in the second authentication information has been tampered with in in the transmission process. In this case, it indicates that the quantum key information carried in the key response packet is unreliable, and the application device does not process the information in the key response packet anymore. In this embodiment of this application, the second message authentication code value is carried in the key response packet sent by the quantum device, so that the application device can perform identity authentication on the quantum device (that is, verify source reliability of the key response packet) and perform message integrity verification on the key response packet.

Step 208: If the verification performed by the application device on the second message authentication code value succeeds, the application device decrypts the first ciphertext by using the first private key, to obtain the quantum key information.

Optionally, the storage information that corresponds to the user identifier and that is in the quantum device includes a second statistical value, and the second statistical value is a sending count that is recorded by the quantum device and that is of the key request packet including the user identifier. The key request packet further includes a first statistical value, and the first statistical value is a sending count that is recorded by the application device and that is of the key request packet including the user identifier. Optionally, the first authentication information further includes the first statistical value. If the service object is the application device, the first statistical value is a quantity of times the application device sends the key request packet including the device identifier (the user identifier) of the application device. During specific implementation, a counter is set in the application device to record the sending count of the key request packet. Each time the application device sends the key request packet, the counter is enabled to add a specified increment value. If the service object is the user account, the first statistical value is a quantity of times that all application devices to which the user account has been for logging in send the key request packet including the user account (the user identifier).

Optionally, before the application device sends, to the quantum device, the key request packet including the user identifier (that is, before step 201 is performed), the application device obtains a historical sending count of the key request packet including the user identifier. The application device adds the specified increment value to the historical sending count, to obtain the first statistical value. That is, the first statistical value calculated by the application device counts in this time of sending the key request packet. Optionally, the specified increment value is 1. Correspondingly, after the quantum device receives the key request packet, if the second statistical value in the obtained storage information corresponding to the user identifier is greater than or equal to the first statistical value, the quantum device stops a quantum key transmission process. If the second statistical value is less than the first statistical value, the quantum device updates the second statistical value, to enable an updated second statistical value to be equal to the first statistical value. Before the quantum device updates a stored statistical value based on the received key request packet, the recorded sending count of the key request packet should be less than the sending count that is recorded by the application device and that is of the key request packet. Therefore, if the first statistical value carried in the key request packet is less than or equal to the second statistical value stored by the quantum device, it indicates that the key request packet may be repeatedly sent by the attacker, that is, the key request packet may be a replay attack packet. In this way, replay attack detection on a quantum device side is implemented. Optionally, if the second statistical value in the obtained storage information corresponding to the user identifier is greater than or equal to the first statistical value, the quantum device further outputs an alarm prompt, where the alarm prompt indicates that a current key request is abnormal. This helps related personnel process an abnormal case in time.

Optionally, when determining that the second statistical value is less than the first statistical value, the quantum device verifies the first message authentication code value (that is, step 203 is performed).

Optionally, the key response packet further includes the updated second statistical value. Optionally, the second authentication information further includes the updated second statistical value. After the application device receives the key response packet, if the statistical value (the updated second statistical value) carried in the key response packet is not equal to the statistical value (the first statistical value) recorded by the application device, the application device stops the quantum key transmission procedure. After the quantum device updates the stored statistical value based on the received key request packet, the recorded sending count of the key request packet should be equal to the sending count that is recorded by the application device and that is of the key request packet. Therefore, if the statistical value carried in the key response packet is not equal to the statistical value recorded by the application device, it indicates that the key response packet may be repeatedly sent by the attacker, that is, the key response packet may be a replay attack packet. In this way, replay attack detection on an application device side is implemented. Optionally, if the statistical value carried in the key response packet is not equal to the statistical value recorded by the application device, the application device further outputs an alarm prompt, where the alarm prompt indicates that the current key request is abnormal. This helps the related personnel process the abnormal case in time.

Optionally, when the updated second statistical value is equal to the first statistical value, the application device verifies the second message authentication code value (that is, step 207 is performed).

According to the quantum key transmission method provided in this embodiment of this application, in a process in which the application device requests the quantum key from the quantum device, bidirectional identity authentication can be performed between the application device and the quantum device, the application device and the quantum device can further respectively perform message integrity verification on packets received by the application device and the quantum device, and the transmission confidentiality of the quantum key is also ensured. In this way, security and reliability of transmission of the quantum key in a classical network are implemented. In addition, in a process in which the application device requests the quantum key from the quantum device, only one round of packet (the key request packet and the key response packet) interaction is needed to complete transmission of the quantum key and identity authentication of the two parties, and an interaction process is simple. In addition, both the bidirectional identity authentication between the application device and the quantum device and the message integrity verification in this embodiment of this application are implemented based on message authentication codes. However, in an existing authentication key exchange solution based on certificates of both communication parties, for example, transport layer security (TLS) bidirectional authentication, in a handshake phase, one communication party needs to sign a packet by using a private key, and the other communication party needs to perform signature verification by using a corresponding public key, to ensure packet source validity and content integrity. Because operation efficiency of a message authentication code is higher than operation efficiency of a signature, compared with the existing authentication key exchange solution, the solution in this application implements higher efficiency of obtaining a key by the application device. In addition, because a primitive such as the message authentication code can resist the quantum attack, and an existing signature algorithm used by the communication party usually does not have quantum resistance, compared with the existing authentication key exchange solution, the solution in this application implements higher reliability of performing identity authentication on both the communication parties and message integrity verification.

Optionally, the technical solutions in this application are divided into two implementation phases: a registration phase and a quantum key obtaining phase. A service object completes registration on a quantum device in the registration phase to establish the first time of mutual trust with the quantum device. That the service object completes the registration on the quantum device includes that the service object and the quantum device synchronize a shared key. The service object completes mutual identity authentication with the quantum device and transmission of a quantum key in the quantum key obtaining phase. For example, the method 200 describes the implementation procedure of the quantum key obtaining phase. The registration phase and the quantum key obtaining phase are independent of each other. After completing registration once, the service object can request the quantum key from the quantum device for a plurality of times. For example, the service object is an application device. After the application device completes registration on the quantum device, the application device can perform a quantum key obtaining procedure for a plurality of times to obtain the quantum key from the quantum device. For another example, the service object is a user account. The user account is for logging in to an application device to complete registration on the quantum device. Then, the user account can be for logging in to the application device or another application device for a plurality of times, to enable the application device to which the user account is for logging in each time to perform the quantum key obtaining procedure to obtain the quantum key from the quantum device. It should be noted that, when the service object is the application device, the application device that completes a registration procedure with the quantum device and the application device that requests the quantum key from the quantum device can only be a same application device. In this case, the application device in the foregoing method 200 and an application device in the following method 300 are a same application device. When the service object is the user account, the application device that completes a registration procedure with the quantum device and the application device that requests the quantum key from the quantum device are a same application device or different application devices to which a same user account is for logging in. In this case, the application device in the foregoing method 200 and an application device in the following method 300 are application devices (a same device or different devices) to which a same user account is for logging in.

Figure 3:
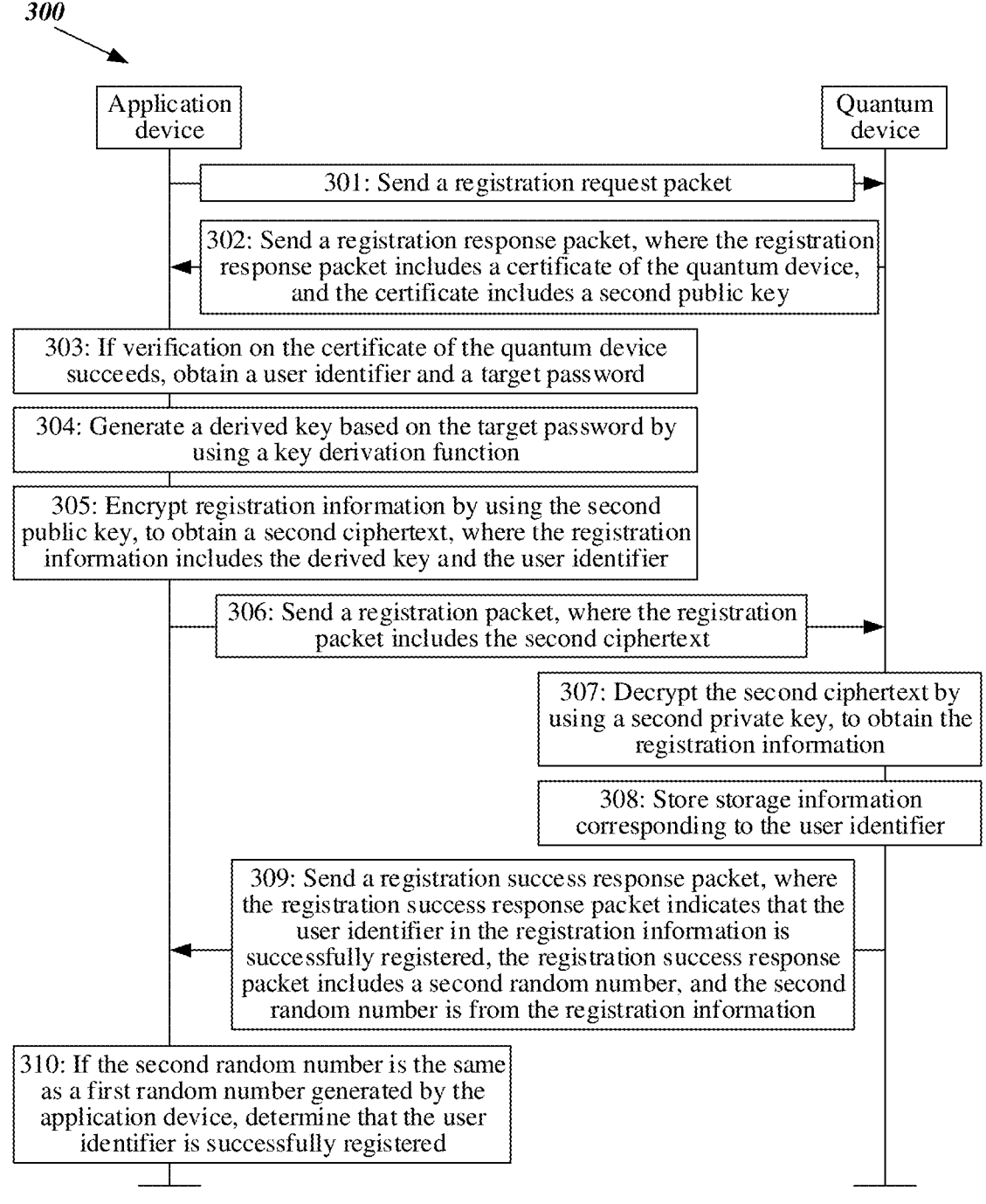
FIG. 3 is a schematic diagram of an implementation procedure of another quantum key transmission method according to an embodiment of this application.

The following embodiment of this application describes an implementation procedure of the registration phase. For example, FIG. 3 is a schematic diagram of an implementation procedure of a quantum key transmission method 300 according to an embodiment of this application. The method 300 shows only the implementation procedure of the registration phase. For a process in which the application device requests the quantum key from the quantum device after completing registration on the quantum device, refer to the foregoing method 200. Details are not described herein again in this embodiment of this application. As shown in FIG. 3, the method 300 includes step 301 to step 310.

Step 301: An application device sends a registration request packet to a quantum device.

The registration request packet is for applying to the quantum device for initiation of a registration procedure. Optionally, the registration request packet indicates cryptographic algorithms supported by the application device. For example, the registration request packet indicates a message authentication code generation algorithm, a key derivation function algorithm, a post-quantum cryptographic algorithm, or the like supported by the application device.

Step 302: After receiving the registration request packet from the application device, the quantum device sends a registration response packet to the application device, where the registration response packet includes a certificate of the quantum device, and the certificate includes a second public key.

The second public key is a public key in a key pair held by the quantum device. In this embodiment of this application, a private key corresponding to the second public key is referred to as a second private key. The second public key and the second private key are respectively a public key and a private key in a key pair obtained by the quantum device by running a post-quantum key generation algorithm.

Optionally, the registration response packet further indicates a target cryptographic algorithm selected by the quantum device from the cryptographic algorithms supported by the application device. The target cryptographic algorithm includes one or more of a generation algorithm of a first message authentication code value (namely, the algorithm used by the application device to calculate the first message authentication code value in step 201), a generation algorithm of a second message authentication code value (namely, the algorithm used by the quantum device to calculate the second message authentication code value in step 205), or a generation algorithm of a shared key (namely, the algorithm for obtaining the shared key based on the derived key in step 201). Optionally, the target key algorithm further includes a post-quantum cryptographic algorithm used by the application device to generate a first public key and a first private key (step 201), and/or a post-quantum cryptographic algorithm used by the quantum device to generate the second public key and the second private key (step 302), so that the application device can encrypt or decrypt a ciphertext by using a matched post-quantum encryption algorithm or post-quantum decryption algorithm.

Step 303: After the application device receives, from the quantum device, the registration response packet corresponding to the registration request packet, if verification performed by the application device on the certificate of the quantum device succeeds, the application device obtains a user identifier and a target password.

The certificate of the quantum device further includes a signature of a third-party authority (for example, a CA). The application device performs identity authentication on the quantum device based on the certificate of the quantum device. That the verification performed by the application device on the certificate of the quantum device succeeds is that signature verification performed by the application device on the certificate of the quantum device by using a public key provided by the third-party authority succeeds. In this way, the application device can determine that the public key in the certificate is indeed from the quantum device, so that a spoofing attack can be avoided. The target password obtained by the application device is a password corresponding to the user identifier obtained by the application device. In this embodiment of this application, the password corresponding to the user identifier is used as a password for a service object indicated by the user identifier to request a service from the quantum device.

Optionally, if the registration request packet requests to use the application device that sends the registration request packet as the service object, the application device uses a device identifier of the application device as the user identifier. If the registration request packet requests to register a user account as the service object, the application device creates the user account after receiving the registration response packet, and uses the created user account as the user identifier.

Optionally, the target password is entered by a user. After receiving the registration response packet, the application device displays a password entering screen to prompt the user to enter the password. Then, the application device uses content entered by the user as the target password.

Step 304: The application device generates a derived key based on the target password by using a key derivation function.

Optionally, the registration response packet further includes a key derivation function parameter value. The key derivation function parameter value includes a random salt value and/or an iteration quantity. The key derivation function parameter value is carried in the registration response packet by the quantum device, to indicate the random salt value and/or the iteration quantity that are/is used when the application device generates the derived key by using the key derivation function. In this case, an implementation of step 304 is as follows: The application device generates the derived key based on the target password and the key derivation function parameter value in the registration response packet by using the key derivation function. For a specific implementation of step 304, refer to the related descriptions in step 201. Details are not described herein again in this embodiment of this application.

Step 305: The application device encrypts registration information by using the second public key, to obtain a second ciphertext, where the registration information includes the derived key and the user identifier.

Optionally, when the registration response packet includes the key derivation function parameter value, the application device uses the key derivation function parameter value obtained from the registration response packet as a part of the registration information. That is, the registration information includes the key derivation function parameter value. For ease of description differentiation, in this embodiment of this application, the key derivation function parameter value in the registration response packet is referred to as a first key derivation function parameter value, and the key derivation function parameter value in the registration information is referred to as a second key derivation function parameter value.

Because the second public key used by the application device to encrypt the registration information is obtained by the quantum device by running the post-quantum key generation algorithm, the application device encrypts the registration information by using a post-quantum encryption algorithm, and then transmits the registration information to the quantum device in a form of a ciphertext, to ensure transmission confidentiality of the registration information. In addition, because the second ciphertext is obtained through encryption by using the post-quantum encryption algorithm, a quantum attack can be resisted, to avoid a leakage that is of the registration information and that is caused by cracking performed by a quantum computer on the second ciphertext.

Optionally, the registration information further includes one or more of the key derivation function parameter value, a device identifier of the quantum device, a hash value of the device identifier of the application device, or a random number generated by the application device.

Step 306: The application device sends a registration packet to the quantum device, where the registration packet includes the second ciphertext.

Optionally, the registration packet further includes the device identifier of the application device. The registration information further includes a first hash value of the device identifier of the application device.

Step 307: After receiving the registration packet from the application device, the quantum device decrypts the second ciphertext by using the second private key, to obtain the registration information.

Step 308: The quantum device stores storage information corresponding to the user identifier.

The user identifier in step 308 is the user identifier obtained by the quantum device from the registration information obtained through decryption in step 307. The storage information corresponding to the user identifier includes the user identifier and a shared key corresponding to the user identifier. The shared key is obtained based on the derived key in the registration information. For example, the quantum device uses the derived key in the registration information as the shared key corresponding to the quantum device and the user identifier in the registration information. Alternatively, the quantum device uses a hash value of the derived key in the registration information as the shared key corresponding to the quantum device and the user identifier in the registration information. It only needs to be ensured that a processing manner of obtaining the shared key based on the derived key by the application device is the same as a processing manner of obtaining the shared key based on the derived key by the quantum device. Optionally, the storage information corresponding to the user identifier in the registration information further includes a part or all of content other than the user identifier in the registration information. For example, the storage information that corresponds to the user identifier and that is stored in the quantum device includes the user identifier, the shared key corresponding to the user identifier, the random salt value and the iteration quantity that are used by the application device to calculate the derived key, and a sending count that is recorded by the quantum device and that is of a key request packet including the user identifier. An initial value of the sending count is 0.

Optionally, when the registration response packet includes the first key derivation function parameter value, and the registration information includes the second key derivation function parameter value, the quantum device first compares the first key derivation function parameter value with the second key derivation function parameter value. If the first key derivation function parameter value is the same as the second key derivation function parameter value, the quantum device stores the storage information corresponding to the user identifier in the registration information.

Because the second key derivation function parameter value carried in the registration packet by the application device is from the first key derivation function parameter value in the registration response packet received by the application device, the first key derivation function parameter value should be the same as the second key derivation function parameter value. If the quantum device finds, after receiving the registration packet, that the second key derivation function parameter value carried in the registration packet from the application device is different from the first key derivation function parameter value carried in the registration response packet sent by the quantum device, it indicates that the registration packet and/or the registration response packet have/has been tampered with in a transmission process. In this embodiment of this application, the quantum device compares the first key derivation function parameter value with the second key derivation function parameter value, so that message integrity verification on bidirectionally communicated packets between the quantum device and the application device can be implemented.

Optionally, when the registration packet includes the device identifier of the application device, and the registration information includes the first hash value of the device identifier of the application device, the quantum device calculates a second hash value of the device identifier of the application device in the registration information after obtaining the registration information. Then, the quantum device compares the first hash value carried in the registration packet with the obtained second hash value through calculation. If the first hash value is the same as the second hash value, the quantum device stores the storage information corresponding to the user identifier.

If the first hash value carried in the registration packet received by the quantum device is different from the second hash value obtained by the quantum device through calculation, it indicates that the registration packet has been tampered with in a transmission process. In this embodiment of this application, the quantum device compares the first hash value with the second hash value, so that message integrity verification on a packet sent by the application device to the quantum device can be implemented.

Optionally, the registration information further includes a first random number generated by the application device. After the quantum device stores the storage information corresponding to the user identifier in the registration information, the following step 309 and step 310 are proceeded to.

Step 309: The quantum device sends a registration success response packet to the application device, where the registration success response packet indicates that the user identifier in the registration information is successfully registered, the registration success response packet includes a second random number, and the second random number is from the registration information.

After obtaining the first random number from the registration information, the quantum device carries the first random number in the registration success response packet. For ease of description differentiation, in this embodiment of this application, a random number in the registration information is referred to as the first random number, and a random number in the registration success response packet is referred to as the second random number. If a packet communicated between the quantum device and the application device has not been tampered with, the first random number should be the same as the second random number.

Step 310: After the application device receives the registration success response packet from the quantum device, if the second random number is the same as the first random number generated by the application device, the application device determines that the user identifier is successfully registered.

That the application device determines that the user identifier is successfully registered is that the application device determines that the service object indicated by the user identifier completes registration on the quantum device.

In embodiments of this application, the identity authentication on the application device is based on the password. The identity authentication on the quantum device in the registration phase depends on the certificate, and the identity authentication on the quantum device in the quantum key obtaining phase depends on the derived key obtained based on the password. In both the registration phase and the quantum key obtaining phase, the application device and the quantum device implement the mutual identity authentication, so that the security and the reliability of the quantum key transmission are ensured. In addition, in the registration phase, the application device encrypts the registration information by using the public key obtained by the quantum device by running the quantum encryption algorithm, and then transmits the registration information to the quantum device in the form of the ciphertext. In the quantum key obtaining phase, the quantum device encrypts the quantum key by using the public key obtained by the application device by running the post-quantum key generation algorithm, and then transmits the quantum key to the application device in the form of the ciphertext. Confidentiality of message transmission between the quantum device and the application device is implemented, and the transmitted ciphertext can resist the quantum attack. Therefore, a risk of a message leakage is reduced.

Sequences of the steps of the quantum key transmission methods provided in embodiments of this application can be appropriately adjusted, or steps can be correspondingly added or deleted based on a situation. A varied method readily figured out by a person skilled in the art within the technical scope disclosed in this application shall fall within the protection scope of this application.

The following describes function modules of a quantum device and an application device by using an example.

A key manager is configured for each of the quantum device and the application device provided in embodiments of this application. Core functions of the solutions in this application are separately implemented by the key managers of the quantum device and the key manager of the application device.

Figures 4, 5:
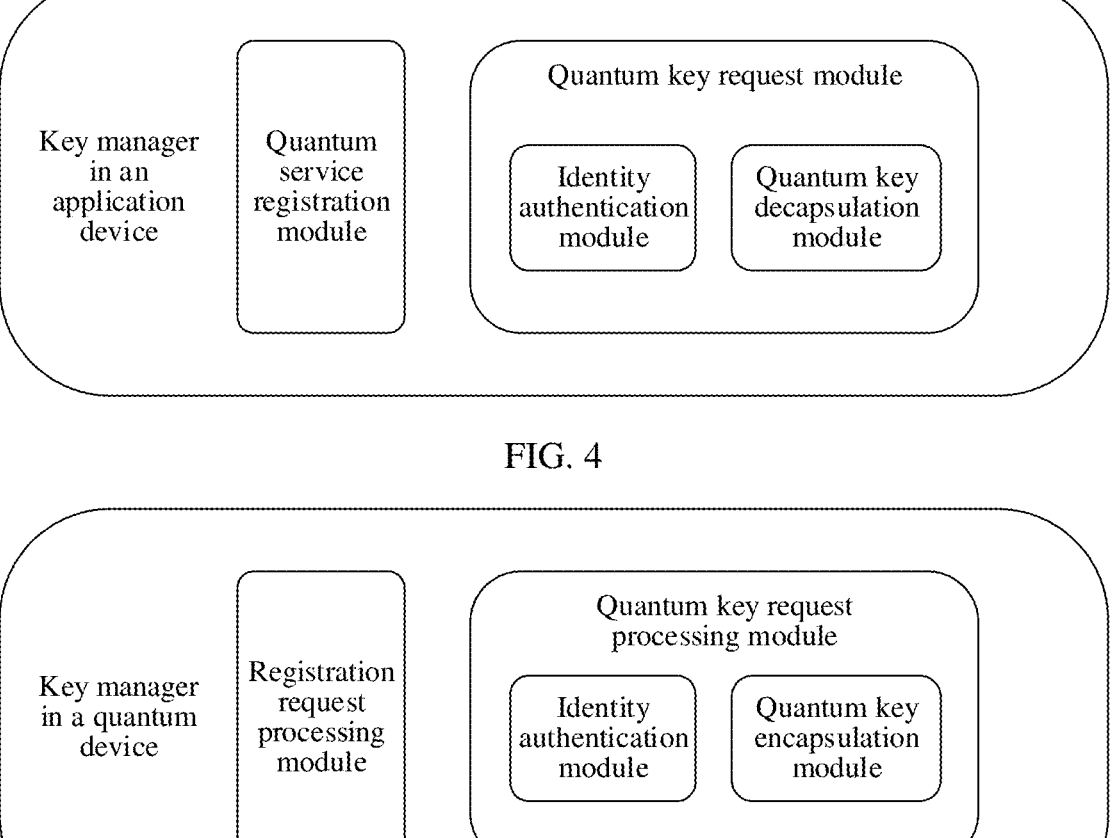
FIG. 4 is a schematic diagram of a structure of a key manager in an application device according to an embodiment of this application.
FIG. 5 is a schematic diagram of a structure of a key manager in a quantum device according to an embodiment of this application.

For example, FIG. 4 is a schematic diagram of a structure of a key manager in an application device according to an embodiment of this application. As shown in FIG. 4, the key manager in the application device includes a quantum service registration module and a quantum key request module. The quantum service registration module is responsible for applying to a quantum device for registration of a service object, and providing necessary identity materials for the quantum device, and specifically performs, for example, step 301, step 303 to step 306, and step 310. The quantum key request module includes an identity authentication module and a quantum key decapsulation module. The identity authentication module is responsible for performing identity authentication on the interactive quantum device in a quantum key obtaining process, and specifically performs, for example, step 207. The quantum key decapsulation module is responsible for decapsulating quantum key information sent by the quantum device, to extract a true quantum key, and specifically performs, for example, step 208.

For example, FIG. 5 is a schematic diagram of a structure of a key manager in a quantum device according to an embodiment of this application. As shown in FIG. 5, the key manager in the quantum device includes a registration request processing module and a quantum key request processing module. The registration request processing module is responsible for processing a registration request from an application device, and specifically performs, for example, step 302 and step 307 to step 309. The quantum key request processing module includes an identity authentication module and a quantum key encapsulation module. The identity authentication module is responsible for performing identity authentication on the interactive application device, and specifically performs, for example, step 203. The quantum key request processing module is responsible for encapsulating quantum key information, and specifically performs, for example, step 204, to ensure confidentiality of transmission of a quantum key in a classical network.

The following describes the system in embodiments of this application by using an example.

An embodiment of this application further provides a quantum key transmission system, including an application device and a quantum device. The application device interacts with the quantum device, so that the application device can obtain a quantum key from the quantum device. For a detailed working process of the application device and the quantum device, refer to the implementation procedure of the quantum key obtaining phase described in the foregoing method 200. For example, the application device is configured to perform step 201, step 207, and step 208 in the foregoing method 200. The quantum device is configured to perform step 202 to step 206 in the foregoing method 200.

Optionally, the application device further interacts with the quantum device, so that the application device can complete registration of a service object on the quantum device. For a detailed working process of the application device and the quantum device, refer to the implementation procedure of the registration phase described in the foregoing method 300. For example, the application device is configured to perform step 301, step 303 to step 306, and step 310 in the foregoing method 300. The quantum device is configured to perform step 302 and step 307 to step 309 in the foregoing method 300.

Figure 6:
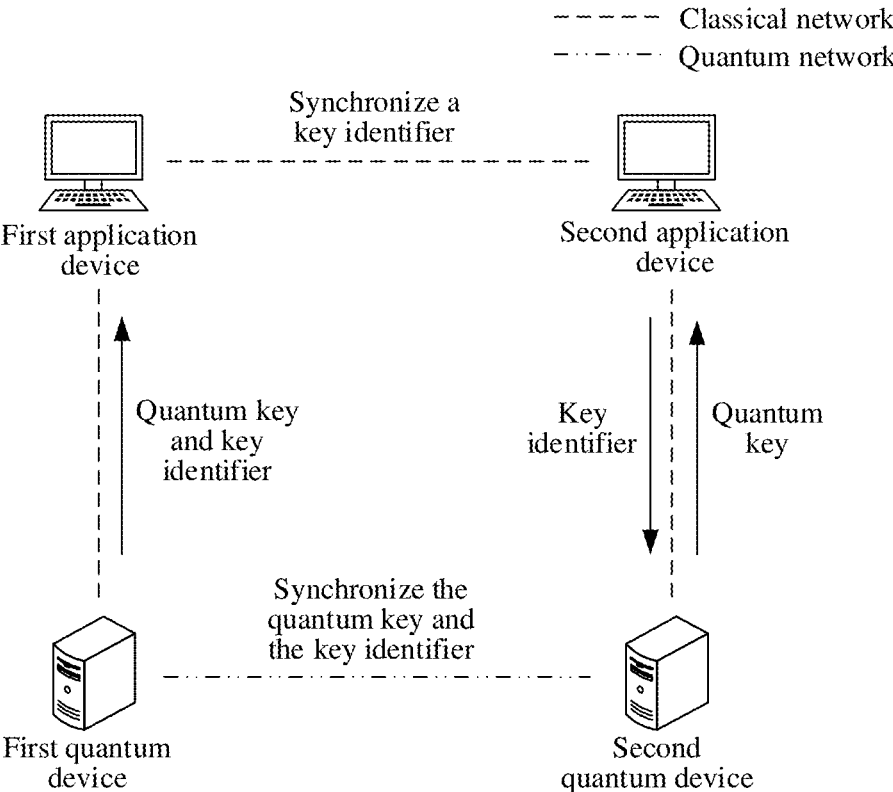
FIG. 6 is a schematic diagram of a structure of a quantum key transmission system according to an embodiment of this application.

For example, FIG. 6 is a schematic diagram of a structure of a quantum key transmission system according to an embodiment of this application. As shown in FIG. 6, the system includes a first application device and a first quantum device. The first application device completes registration on the first quantum device, or a user account for logging in to the first application device completes registration on the first quantum device. For a specific registration process, refer to the descriptions in the foregoing method 300. The first quantum device can provide a quantum service for the first application device. Optionally, when the first application device is a communication initiator, the first application device requests a quantum key from the first quantum device. For a process in which the first application device requests the quantum key from the first quantum device, refer to the descriptions in the foregoing method 200.

For example, the first application device is configured to send a key request packet to the first quantum device, where the key request packet includes a user identifier corresponding to the first application device, a first public key, and a first message authentication code value, the first public key is a public key in a key pair obtained by the first application device by running a post-quantum key generation algorithm, the first message authentication code value is obtained by the first application device by calculating first authentication information based on a shared key corresponding to the quantum device and the user identifier, and the first authentication information includes the first public key. The first quantum device is configured to obtain, based on the key request packet, the first authentication information and storage information that corresponds to the user identifier, where the storage information includes the shared key. The first quantum device is configured to verify the first message authentication code value based on the shared key and the first authentication information. If the verification performed by the first quantum device on the first message authentication code value succeeds, the first quantum device is configured to encrypt quantum key information by using the first public key, to obtain a first ciphertext, where the quantum key information includes a quantum key. The first quantum device is configured to calculate second authentication information based on the shared key, to obtain a second message authentication code value, where the second authentication information includes the first ciphertext. The first quantum device is configured to send, to the first application device, a key response packet corresponding to the key request packet, where the key response packet includes the first ciphertext and the second message authentication code value. The first application device is configured to obtain the second authentication information based on the key response packet. The first application device is configured to verify the second message authentication code value based on the shared key and the second authentication information. If the verification performed by the first application device on the second message authentication code value succeeds, the first application device is configured to decrypt the first ciphertext by using a first private key, to obtain the quantum key information, where the first private key is a private key in a key pair obtained by the first application device by running a post-quantum key generation algorithm, and the first private key is a private key corresponding to the first public key.

Optionally, the quantum key information allocated by the first quantum device to the first application device further includes a key identifier of the quantum key.

Optionally, still refer to FIG. 6. The system further includes a second application device and a second quantum device. The second application device completes registration on the second quantum device, or a user account for logging in to the second application device completes registration on the second quantum device. For a specific registration process, refer to the descriptions in the foregoing method 300. The second quantum device can provide a quantum service for the second application device. Optionally, when the second application device is a communication receiver, the second application device requests a quantum key of a communication initiator from the second quantum device.

For example, the first quantum device is further configured to send the quantum key information to the second quantum device; the first application device is further configured to send the key identifier to the second application device; the second application device is configured to send a key obtaining request to the second quantum device, where the key obtaining request includes the key identifier; the second quantum device is configured to send the quantum key to the second application device based on the key identifier; and the first application device and the second application device are configured to perform communication based on the quantum key.

For a manner in which the second application device sends the key obtaining request to the second quantum device, refer to the manner in which the application device sends the key request packet to the quantum device in the foregoing method 200. For a specific process, refer to step 201 in the foregoing method 200. For example, content included in the key obtaining request includes the key identifier more than that in the key request packet, to indicate the second quantum device to obtain the quantum key indicated by the key identifier. For a manner in which the second quantum device processes the key obtaining request, refer to the manner in which the quantum device processes the key request packet in the foregoing method 200. For a specific process, refer to step 202 to step 206 in the foregoing method 200. A difference lies in that an encryption object of the second quantum device herein is the quantum key indicated by the key identifier. Correspondingly, for a manner in which the second application device processes the ciphertext that is obtained by encrypting the quantum key and that is from the second quantum device, refer to the manner in which the application device processes the key response packet in the foregoing method 200. For a specific process, refer to step 207 and step 208 in the foregoing method 200.

Optionally, still refer to FIG. 6. The first quantum device communicates with the second quantum device through a quantum network, the first quantum device communicates with the first application device through a classical network, the second quantum device communicates with the second application device through the classical network, and the first application device communicates with the second application device through the classical network.

The system shown in FIG. 6 is described by using an example in which a quantum device (the first quantum device) that provides the quantum service for the first application device is different from a quantum device (the second quantum device) that provides the quantum service for the second application device. If a same quantum device provides the quantum service for the first application device and the second application device, during implementation of the technical solution, a step of synchronizing the quantum key information between the two quantum devices is omitted.

In the quantum key transmission system provided in this embodiment of this application, a quantum key is securely and reliably transmitted from a quantum device to an application device across security domains. When two application devices that communicate with each other through a classical network need to use the quantum key for communication, a communication initiator obtains the quantum key and a key identifier from a corresponding quantum device. Then, the communication initiator synchronizes the key identifier with a communication receiver through the classical network. If different quantum devices provide quantum services for the communication initiator and the communication receiver, the quantum device corresponding to the communication initiator further synchronizes the quantum key and the key identifier with a quantum device corresponding to the communication receiver. In this way, the communication receiver can request, from the corresponding quantum device, the quantum key corresponding to the key identifier, so that the two communication parties can perform communication based on the quantum key. A process of transmitting the quantum key from the quantum device to the application device is secure and reliable, transmission of the quantum key through a quantum network is always secure, and the key identifier of the quantum key rather than the quantum key is communicated between the two application devices, so that a stealer cannot steal the quantum key from a communication process of the two application devices. Therefore, an entire process of obtaining the quantum key by the two communication parties is secure and reliable, and communication security and reliability can be improved.

The following describes a basic hardware structure of an application device by using an example.

Figure 7:
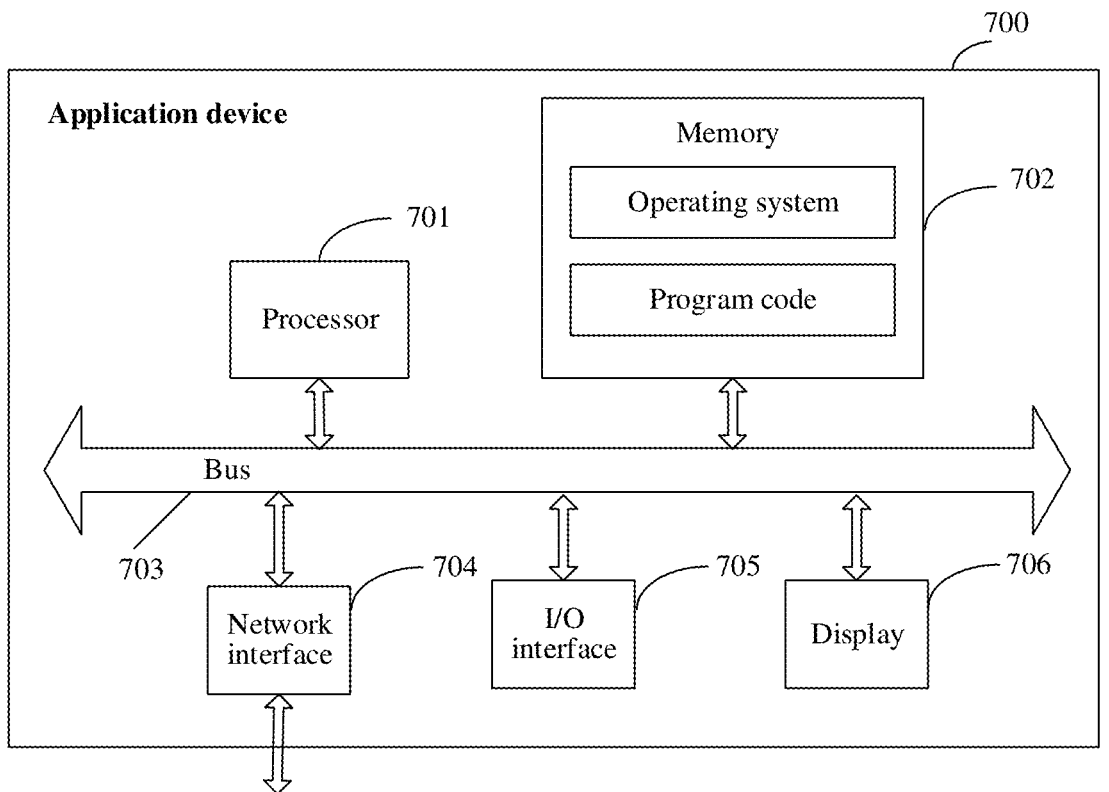
FIG. 7 is a schematic diagram of a hardware structure of an application device according to an embodiment of this application.

For example, FIG. 7 is a schematic diagram of a hardware structure of an application device according to an embodiment of this application. As shown in FIG. 7, the application device 700 includes a processor 701 and a memory 702, and the processor 701 and the memory 702 are connected to each other through a bus 703. Descriptions are provided by using an example in which the processor 701 and the memory 702 are independent of each other in FIG. 7. Optionally, the processor 701 and the memory 702 are integrated together. Optionally, with reference to FIG. 1, the application device 700 in FIG. 7 is any application device shown in FIG. 1.

The memory 702 is configured to store a computer program, and the computer program includes an operating system and program code. The memory 702 is a storage medium of various types, for example, a read-only memory (ROM), a random access memory (RAM), an electrically erasable programmable read-only memory (EEPROM), a compact disc read-only memory (CD-ROM), a flash memory, an optical memory, a register, a compact disc storage, an optical disc storage, a magnetic disk, or another magnetic storage device.

The processor 701 is a general-purpose processor or a dedicated processor. The processor 701 may be a single-core processor or a multi-core processor. The processor 701 includes at least one circuit, to perform an action performed by the application device in the method 200 or the method 300 provided in embodiments of this application.

Optionally, the application device 700 further includes a network interface 704, and the network interface 704 is connected to the processor 701 and the memory 702 through the bus 703. The network interface 704 can implement communication between the application device 700 and a quantum device or another application device. Through the network interface 704, the processor 701 can interact with the quantum device to register a service object, obtain a quantum key, and so on; and communicate with the another application device, and so on.

Optionally, the application device 700 further includes an input/output (I/O) interface 705, and the I/O interface 705 is connected to the processor 701 and the memory 702 through the bus 703. The processor 701 can receive an input command, input data, or the like through the I/O interface 705. The I/O interface 705 is used by the application device 700 to connect to input devices, where the input devices are, for example, a keyboard and a mouse. Optionally, in some possible scenarios, the network interface 704 and the I/O interface 705 are collectively referred to as a communication interface.

Optionally, the application device 700 further includes a display 706, and the display 706 is connected to the processor 701 and the memory 702 through the bus 703. The display 706 can be configured to display an intermediate result and/or a final result generated by the processor 701 by performing the foregoing method, for example, display an alarm prompt. In a possible implementation, the display 706 is a touchscreen, to provide a human-computer interaction interface.

The bus 703 is any type of communication bus configured to implement interconnection between internal components of the application device 700, for example, a system bus. In this embodiment of this application, an example in which the internal components of the application device 700 are interconnected through the bus 703 is used for description. Optionally, the internal components of the application device 700 are communicatively connected to each other in a connection manner other than through the bus 703. For example, the internal components of the application device 700 are interconnected through an internal logical interface of the application device 700.

The foregoing components may be separately disposed on chips independent of each other, or at least some or all of the components may be disposed on a same chip. Whether the components are separately disposed on different chips or integrated and disposed on one or more chips usually depends on a requirement of a product design. This embodiment of this application imposes no limitation on specific implementation forms of the foregoing components.

The application device 700 shown in FIG. 7 is merely an example. In an implementation process, the application device 700 includes other components, which are not listed one by one in this specification. The application device 700 shown in FIG. 7 may implement transmission of the quantum key by performing all or some steps of the method provided in the foregoing embodiments.

The following describes a basic hardware structure of a quantum device by using an example.

Figure 8:
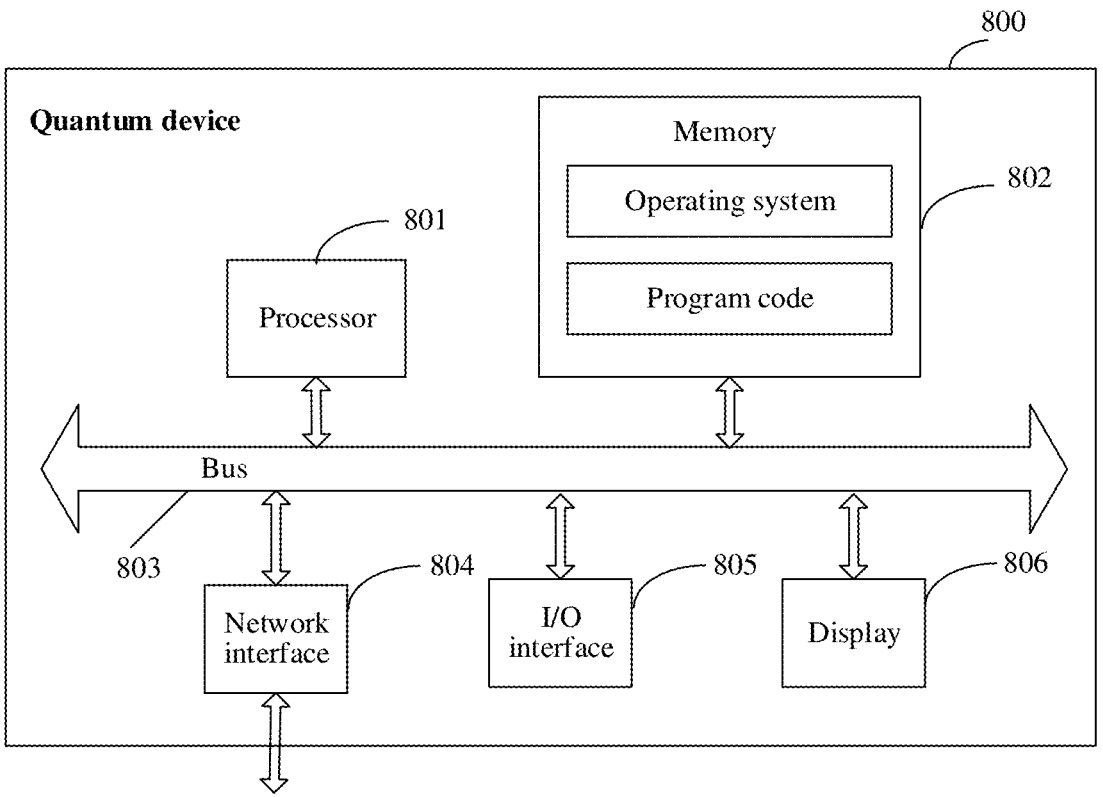
FIG. 8 is a schematic diagram of a hardware structure of a quantum device according to an embodiment of this application.

For example, FIG. 8 is a schematic diagram of a hardware structure of a quantum device according to an embodiment of this application. As shown in FIG. 8, the quantum device 800 includes a processor 801 and a memory 802, and the processor 801 and the memory 802 are connected to each other through a bus 803. Descriptions are provided by using an example in which the processor 801 and the memory 802 are independent of each other in FIG. 8. Optionally, the processor 801 and the memory 802 are integrated together. Optionally, with reference to FIG. 1, the quantum device 800 in FIG. 8 is the quantum device shown in FIG. 1.

The memory 802 is configured to store a computer program, and the computer program includes an operating system and program code. The memory 802 is a storage medium of various types, for example, a ROM, a RAM, an EEPROM, a CD-ROM, a flash memory, an optical memory, a register, a compact disc storage, an optical disc storage, a magnetic disk, or another magnetic storage device.

The processor 801 is a general-purpose processor or a dedicated processor. The processor 801 may be a single-core processor or a multi-core processor. The processor 801 includes at least one circuit, to perform an action performed by the quantum device in the method 200 or the method 300 provided in embodiments of this application.

Optionally, the quantum device 800 further includes a network interface 804, and the network interface 804 is connected to the processor 801 and the memory 802 through the bus 803. The network interface 804 can implement communication between the quantum device 800 and an application device or another quantum device. Through the network interface 804, the processor 801 can interact with the application device to register a service object, provide a quantum key, and so on; and interact with the another quantum device to synchronize quantum key information, and so on.

Optionally, the quantum device 800 further includes an I/O interface 805, and the I/O interface 805 is connected to the processor 801 and the memory 802 through the bus 803. The processor 801 can receive an input command, input data, or the like through the I/O interface 805. The I/O interface 805 is used by the quantum device 800 to connect to input devices, where the input devices are, for example, a keyboard and a mouse. Optionally, in some possible scenarios, the network interface 804 and the I/O interface 805 are collectively referred to as a communication interface.

Optionally, the quantum device 800 further includes a display 806, and the display 806 is connected to the processor 801 and the memory 802 through the bus 803. The display 806 can be configured to display an intermediate result and/or a final result generated by the processor 801 by performing the foregoing method, for example, display an alarm prompt. In a possible implementation, the display 806 is a touchscreen, to provide a human-computer interaction interface.

The bus 803 is any type of communication bus configured to implement interconnection between internal components of the quantum device 800, for example, a system bus. In this embodiment of this application, an example in which the internal components of the quantum device 800 are interconnected through the bus 803 is used for description. Optionally, the internal components of the quantum device 800 are communicatively connected to each other in a connection manner other than through the bus 803. For example, the internal components of the quantum device 800 are interconnected through an internal logical interface of the quantum device 800.

The foregoing components may be separately disposed on chips independent of each other, or at least some or all of the components may be disposed on a same chip. Whether the components are separately disposed on different chips or integrated and disposed on one or more chips usually depends on a requirement of a product design. This embodiment of this application imposes no limitation on specific implementation forms of the foregoing components.

The quantum device 800 shown in FIG. 8 is merely an example. In an implementation process, the quantum device 800 includes other components, which are not listed one by one in this specification. The quantum device 800 shown in FIG. 8 may implement transmission of the quantum key by performing all or some steps of the method provided in the foregoing embodiments.

The following describes a virtual apparatus in embodiments of this application by using an example.

Figure 9:
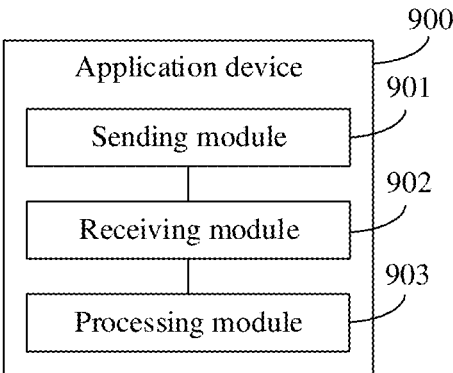
FIG. 9 is a schematic diagram of a structure of an application device according to an embodiment of this application.

FIG. 9 is a schematic diagram of a structure of an application device according to an embodiment of this application. The application device having the structure shown in FIG. 9 implements functions of the application device in the solution described in the foregoing embodiments. Optionally, the application device shown in FIG. 9 is any application device in the application scenario shown in FIG. 1 or FIG. 6, the application device shown in FIG. 4, or the application device shown in FIG. 7, and performs functions of the application device described in the embodiment shown in FIG. 2 or FIG. 3. As shown in FIG. 9, the application device 900 includes a sending module 901, a receiving module 902, and a processing module 903.

The sending module 901 is configured to send a key request packet to a quantum device, where the key request packet includes a user identifier corresponding to the application device, a first public key, and a first message authentication code value, the user identifier is used by the quantum device to obtain corresponding storage information, the storage information includes a shared key corresponding to the quantum device and the user identifier, the first public key is used by the quantum device to encrypt quantum key information allocated to the application device, the quantum key information includes a quantum key, the first public key is a public key in a key pair obtained by the application device by running a post-quantum key generation algorithm, the first message authentication code value is obtained by the application device by calculating first authentication information based on the shared key, and the first authentication information includes the first public key.

The receiving module 902 is configured to receive, from the quantum device, a key response packet corresponding to the key request packet, where the key response packet includes a first ciphertext and a second message authentication code value.

The processing module 903 is configured to verify the second message authentication code value based on the shared key and second authentication information, where the second authentication information includes the first ciphertext.

The processing module 903 is further configured to: if the verification performed by the application device on the second message authentication code value succeeds, decrypt the first ciphertext by using a first private key, to obtain the quantum key information, where the first private key is a private key in the key pair.

Herein, for a detailed working process of the sending module 901, the receiving module 902, and the processing module 903, refer to the descriptions in the foregoing method embodiments. For example, the sending module 901 sends the key request packet to the quantum device by using step 201 in the method 200. The receiving module 902 receives the key response packet from the quantum device by using step 206 in the method 200. The processing module 903 processes the key response packet from the quantum device by using step 207 and step 208 in the method 200. This is not repeated herein again in this embodiment of this application.

Optionally, the user identifier corresponding to the application device is a device identifier of the application device, or the user identifier corresponding to the application device is a user account for logging in to the application device.

Optionally, the key request packet further includes a first statistical value. The processing module 903 is further configured to: before the key request packet is sent to the quantum device, obtain a historical sending count of the key request packet including the user identifier; and add a specified increment value to the historical sending count, to obtain the first statistical value. Herein, for a detailed working process of the processing module 903, refer to the related descriptions in the method 200.

Optionally, the key response packet further includes a second statistical value. The second statistical value is a sending count that is recorded by the quantum device and that is of the key request packet including the user identifier. The processing module 903 is further configured to: after the key response packet is received, if the second statistical value is not equal to the first statistical value, stop a quantum key transmission procedure. Herein, for a detailed working process of the processing module 903, refer to the related descriptions in the method 200.

Optionally, the first authentication information further includes one or more of a device identifier of the quantum device, the user identifier, or the first statistical value.

Optionally, the processing module 903 is further configured to: before the sending module 901 sends the key request packet to the quantum device, generate a derived key based on a target password by using a key derivation function, where the shared key is obtained based on the derived key. Herein, for a detailed working process of the processing module 903, refer to the related descriptions of step 201 in the method 200.

Optionally, the processing module 903 is further configured to: before the sending module 901 sends the key request packet to the quantum device, in response to obtaining of an entered quantum key obtaining instruction, run the post-quantum key generation algorithm to generate the key pair, where the quantum key obtaining instruction includes the target password; and calculate the first authentication information based on the shared key, to obtain the first message authentication code value. Herein, for a detailed working process of the processing module 903, refer to the related descriptions of step 201 in the method 200.

Optionally, the sending module 901 is further configured to: before the key request packet is sent to the quantum device, send a registration request packet to the quantum device. The receiving module 902 is further configured to receive, from the quantum device, a registration response packet corresponding to the registration request packet, where the registration response packet includes a certificate of the quantum device, and the certificate includes a second public key. The processing module 903 is further configured to: if verification performed by the application device on the certificate succeeds, encrypt registration information by using the second public key, to obtain a second ciphertext, where the registration information includes the derived key and the user identifier. The sending module 901 is further configured to send a registration packet to the quantum device, where the registration packet includes the second ciphertext. Herein, for a detailed working process of the sending module 901, refer to the related descriptions of step 301 and step 306 in the method 300. For a detailed working process of the receiving module 902, refer to the related descriptions of step 302 in the method 300. For a detailed working process of the processing module 903, refer to the related descriptions of step 305 in the method 300.

Optionally, the registration request packet indicates cryptographic algorithms supported by the application device, the registration response packet further indicates a target cryptographic algorithm selected by the quantum device from the cryptographic algorithms supported by the application device, and the target cryptographic algorithm includes one or more of a generation algorithm of the first message authentication code value, a generation algorithm of the second message authentication code value, or a generation algorithm of the shared key.

Optionally, the registration response packet further includes a key derivation function parameter value. The key derivation function parameter value includes a random salt value and/or an iteration quantity. The processing module 903 is further configured to: after the receiving module 902 receives the registration response packet, obtain the user identifier and the target password; and generate the derived key based on the target password and the key derivation function parameter value by using the key derivation function. Herein, for a detailed working process of the processing module 903, refer to the related descriptions of step 303 and step 304 in the method 300.

Optionally, the registration packet further includes the device identifier of the application device. The registration information further includes a hash value of the device identifier of the application device.

Optionally, the registration information further includes a first random number generated by the application device. The receiving module 902 is further configured to receive a registration success response packet from the quantum device, where the registration success response packet indicates that the user identifier is successfully registered, and the registration success response packet includes a second random number. The processing module 903 is further configured to: if the second random number is the same as the first random number, determine that the user identifier is successfully registered. Herein, for a detailed working process of the receiving module 902, refer to the related descriptions of step 309 in the method 300. For a detailed working process of the processing module 903, refer to the related descriptions of step 310 in the method 300.

Optionally, the processing module 903 is configured to calculate the second authentication information based on the shared key, to obtain a third message authentication code value; and if the third message authentication code value is the same as the second message authentication code value, determine that the verification on the second message authentication code value succeeds. Herein, for a detailed working process of the processing module 903, refer to the related descriptions of step 207 in the method 200.

Optionally, the application device communicates with the quantum device through a classical network.

Figure 10:
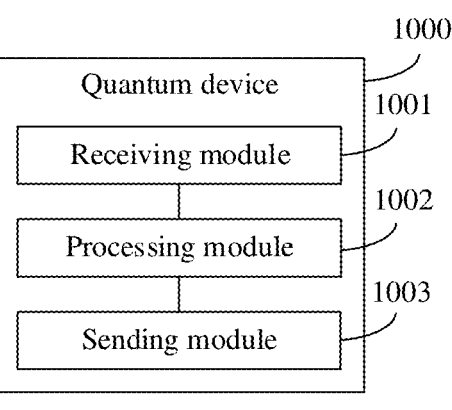
FIG. 10 is a schematic diagram of a structure of a quantum device according to an embodiment of this application.

FIG. 10 is a schematic diagram of a structure of a quantum device according to an embodiment of this application. The quantum device having the structure shown in FIG. 10 implements functions of the quantum device in the solution described in the foregoing embodiments. Optionally, the quantum device shown in FIG. 10 is the quantum device in the application scenario shown in FIG. 1 or FIG. 6, the quantum device shown in FIG. 5, or the quantum device shown in FIG. 8, and performs functions of the quantum device described in the embodiment shown in FIG. 2 or FIG. 3. As shown in FIG. 10, the quantum device 1000 includes a receiving module 1001, a processing module 1002, and a sending module 1003.

The receiving module 1001 is configured to receive a key request packet from an application device, where the key request packet includes a user identifier corresponding to the application device, a first public key, and a first message authentication code value.

The processing module 1002 is configured to obtain, based on the key request packet, first authentication information and storage information that corresponds to the user identifier, where the storage information includes a shared key corresponding to the quantum device and the user identifier, and the first authentication information includes the first public key.

The processing module 1002 is further configured to verify the first message authentication code value based on the shared key and the first authentication information.

The processing module 1002 is further configured to: if the verification performed by the quantum device on the first message authentication code value succeeds, encrypt quantum key information by using the first public key, to obtain a first ciphertext, where the quantum key information includes a quantum key.

The processing module 1002 is further configured to calculate second authentication information based on the shared key, to obtain a second message authentication code value, where the second authentication information includes the first ciphertext.

The sending module 1003 is configured to send, to the application device, a key response packet corresponding to the key request packet, where the key response packet includes the first ciphertext and the second message authentication code value.

Herein, for a detailed working process of the receiving module 1001, the processing module 1002, and the sending module 1003, refer to the descriptions in the foregoing method embodiments. For example, the receiving module 1001 receives the key request packet from the application device by using step 201 in the method 200. The processing module 1002 processes the key request packet from the application device by using step 202 to step 205 in the method 200. The sending module 1003 sends the key response packet to the application device by using step 206 in the method 200. This is not repeated herein again in this embodiment of this application.

Optionally, the user identifier corresponding to the application device is a device identifier of the application device, or the user identifier corresponding to the application device is a user account for logging in to the application device.

Optionally, the key request packet further includes a first statistical value. The first statistical value is a sending count that is recorded by the application device and that is of the key request packet including the user identifier. The storage information includes a second statistical value. The second statistical value is a sending count that is recorded by the quantum device and that is of the key request packet including the user identifier. The processing module 1002 is further configured to: after obtaining the storage information that corresponds to the user identifier, if the second statistical value is greater than or equal to the first statistical value, stop a quantum key transmission procedure; or if the second statistical value is less than the first statistical value, update the second statistical value, to enable an updated second statistical value to be equal to the first statistical value. Herein, for a detailed working process of the processing module 1002, refer to the related descriptions in the method 200.

Optionally, the key response packet further includes the updated second statistical value.

Optionally, the second authentication information further includes one or more of a device identifier of the quantum device, the user identifier, or the updated second statistical value.

Optionally, the receiving module 1001 is further configured to receive a registration request packet from the application device. The sending module 1003 is further configured to send a registration response packet to the application device, where the registration response packet includes a certificate of the quantum device, the certificate includes a second public key, and the second public key is a public key in a key pair obtained by the quantum device by running a post-quantum key generation algorithm. The processing module 1002 is further configured to: if the receiving module 1001 receives, from the application device, a registration packet including a second ciphertext, decrypt the second ciphertext by using a second private key, to obtain registration information, where the registration information includes a derived key and the user identifier that corresponds to the application device, and the second private key is a private key in the key pair; and store the storage information corresponding to the user identifier, where the storage information includes the user identifier and the shared key that is obtained based on the derived key. Herein, for a detailed working process of the receiving module 1001, refer to the related descriptions of step 301 and step 306 in the method 300. For a detailed working process of the processing module 1002, refer to the related descriptions of step 307 and step 308 in the method 300. For a detailed working process of the sending module 1003, refer to the related descriptions of step 302 in the method 300.

Optionally, the registration request packet indicates cryptographic algorithms supported by the application device, the registration response packet further indicates a target cryptographic algorithm selected by the quantum device from the cryptographic algorithms supported by the application device, and the target cryptographic algorithm includes one or more of a generation algorithm of the first message authentication code value, a generation algorithm of the second message authentication code value, or a generation algorithm of the shared key.

Optionally, the registration response packet further includes a first key derivation function parameter value. The first key derivation function parameter value includes a random salt value and/or an iteration quantity. The registration information further includes a second key derivation function parameter value. The processing module 1002 is further configured to: after obtaining the registration information, compare the first key derivation function parameter value with the second key derivation function parameter value; and if the first key derivation function parameter value is the same as the second key derivation function parameter value, store the storage information corresponding to the user identifier. Herein, for a detailed working process of the processing module 1002, refer to the related descriptions of step 308 in the method 300.

Optionally, the registration packet further includes the device identifier of the application device. The registration information further includes a first hash value of the device identifier of the application device. The processing module 1002 is further configured to: after obtaining the registration information, calculate a second hash value of the device identifier of the application device; compare the first hash value with the second hash value; and if the first hash value is the same as the second hash value, store the storage information corresponding to the user identifier. Herein, for a detailed working process of the processing module 1002, refer to the related descriptions of step 308 in the method 300.

Optionally, the registration information further includes a random number generated by the application device. The sending module 1003 is further configured to: after the processing module 1002 stores the storage information corresponding to the user identifier, send a registration success response packet to the application device, where the registration success response packet indicates that the user identifier is successfully registered, and the registration success response packet includes the random number. Herein, for a detailed working process of the sending module 1003, refer to the related descriptions of step 309 in the method 300.

Optionally, the processing module 1002 is configured to: calculate the first authentication information based on the shared key, to obtain a fourth message authentication code value; and if the fourth message authentication code value is the same as the first message authentication code value, determine that the verification on the first message authentication code value succeeds. Herein, for a detailed working process of the processing module 1002, refer to the related descriptions of step 203 in the method 200.

Optionally, the application device communicates with the quantum device through a classical network.

An embodiment of this application further provides a computer-readable storage medium. The computer-readable storage medium stores instructions. When the instructions are executed by a processor of an application device, the steps performed by the application device in the method 200 or the method 300 are implemented. Alternatively, when the instructions are executed by a processor of a quantum device, the steps performed by the quantum device in the method 200 or the method 300 are implemented.

An embodiment of this application further provides a computer program product, including a computer program. When the computer program is executed by a processor of an application device, the steps performed by the application device in the method 200 or the method 300 are implemented. Alternatively, when the computer program is executed by a processor of a quantum device, the steps performed by the quantum device in the method 300 are implemented.

A person of ordinary skill in the art may understand that all or some of the steps of the foregoing embodiments may be implemented by hardware or by a program instructing related hardware. The program may be stored in a computer-readable storage medium. The foregoing storage medium may be a read-only memory, a magnetic disk, an optical disc, or the like.

In embodiments of this application, the terms "first", "second", and "third" are merely for description, but cannot be understood as an indication or implication of relative importance.

The term "and/or" in this application describes only an association relationship between associated objects and represents that three relationships may exist. For example, A and/or B may represent the following three cases: Only A exists, both A and B exist, and only B exists. In addition, the character "/" in this specification generally indicates an "or" relationship between associated objects.

It should be noted that, information (including but not limited to user equipment information, user personal information, and the like), data (including but not limited to data for analysis, stored data, displayed data, and the like), and a signal in this application are all authorized by a user or fully authorized by all parties, and collection, use, and processing of related data need to comply with related laws, regulations, and standards of related countries and regions. For example, the quantum key information, the registration information, and the like in this application are all obtained with full authorization.

The foregoing descriptions are only optional embodiments of this application, but are not intended to limit this application. Any modification, equivalent replacement, improvement, or the like made within the concept and principle of this application should fall within the protection scope of this application.

What is claimed is:

1. A method, comprising:
   generating, by an application device, a derived key based on a target password by using a key derivation function;
   sending, by the application device, a key request packet to a quantum device, wherein the key request packet comprises a user identifier corresponding to the application device, a first public key, and a first message authentication code value, wherein the user identifier is used by the quantum device to obtain storage information that corresponds to the user identifier, and the storage information comprises a shared key corresponding to the quantum device and the user identifier, wherein the first public key is used by the quantum device to encrypt quantum key information allocated to the application device, and the quantum key information comprises a quantum key, wherein the first public key is in a key pair obtained by the application device by running a post-quantum key generation algorithm, the first message authentication code value is obtained by the application device by calculating first authentication information based on the shared key, and the first authentication information comprises the first public key, and wherein the shared key is obtained based on the derived key;

receiving, by the application device from the quantum device, a key response packet corresponding to the key request packet, wherein the key response packet comprises a first ciphertext and a second message authentication code value;

verifying, by the application device, the second message authentication code value based on the shared key and second authentication information, wherein the second authentication information comprises the first ciphertext; and in response to the verifying performed by the application device on the second message authentication code value succeeding, decrypting, by the application device, the first ciphertext by using a first private key, to obtain the quantum key information, wherein the first private key is a private key in the key pair.

2. The method according to claim 1, wherein the user identifier corresponding to the application device is a device identifier of the application device, or the user identifier corresponding to the application device is a user account for logging in to the application device.

3. The method according to claim 1, wherein the key request packet further comprises a first statistical value, and before sending, by the application device, the key request packet to the quantum device, the method further comprises:

obtaining, by the application device, a historical sending count of the key request packet comprising the user identifier; and adding, by the application device, a specified increment value to the historical sending count, to obtain the first statistical value.

4. The method according to claim 3, wherein the key response packet further comprises a second statistical value, the second statistical value is a sending count that is recorded by the quantum device and that is of the key request packet comprising the user identifier, and after receiving, by the application device, the key response packet corresponding to the key request packet, the method further comprises:

when the second statistical value is not equal to the first statistical value, stopping, by the application device, a quantum key transmission procedure.

5. The method according to claim 1, wherein before sending, by the application device, the key request packet to the quantum device, the method further comprises:

in response to obtaining of an entered quantum key obtaining instruction, running, by the application device, the post-quantum key generation algorithm to generate the key pair, wherein the quantum key obtaining instruction comprises the target password; and calculating, by the application device, the first authentication information based on the shared key, to obtain the first message authentication code value.

6. The method according to claim 1, wherein before sending, by the application device, the key request packet to the quantum device, the method further comprises:

sending, by the application device, a registration request packet to the quantum device;

receiving, by the application device from the quantum device, a registration response packet corresponding to the registration request packet, wherein the registration response packet comprises a certificate of the quantum device, and the certificate comprises a second public key;

in response to verification performed by the application device on the certificate succeeding, encrypting, by the application device, registration information by using the second public key, to obtain a second ciphertext, wherein the registration information comprises the derived key and the user identifier; and sending, by the application device, a registration packet to the quantum device, wherein the registration packet comprises the second ciphertext.

7. The method according to claim 6, wherein the registration packet further comprises a device identifier of the application device, and the registration information further comprises a hash value of the device identifier of the application device.

8. The method according to claim 1, wherein the verifying, by the application device, the second message authentication code value based on the shared key and the second authentication information comprises:

calculating, by the application device, the second authentication information based on the shared key, to obtain a third message authentication code value; and when the third message authentication code value is the same as the second message authentication code value, determining, by the application device, that the verification on the second message authentication code value succeeds.

9. The method according to claim 1, wherein the storage information further comprises the quantum key.

10. A method, comprising:

receiving, by a quantum device, a key request packet from an application device, wherein the key request packet comprises a user identifier corresponding to the application device, a first public key, a first statistical value, and a first message authentication code value, wherein the first statistical value is a sending count that is recorded by the application device and that is of the key request packet comprising the user identifier;

obtaining, by the quantum device based on the key request packet, first authentication information and storage information that corresponds to the user identifier, wherein the storage information comprises a shared key corresponding to the quantum device and the user identifier, the first authentication information comprises the first public key, the storage information further comprises a second statistical value, the second statistical value is a sending count that is recorded by the quantum device and that is of the key request packet comprising the user identifier;

when the second statistical value is greater than or equal to the first statistical value, stopping, by the quantum device, a quantum key transmission procedure, or when the second statistical value is less than the first statistical value, updating, by the quantum device, the second statistical value, to enable an updated second statistical value to be equal to the first statistical value;

verifying, by the quantum device, the first message authentication code value based on the shared key and the first authentication information;

in response to the verifying performed by the quantum device on the first message authentication code value succeeding, encrypting, by the quantum device, quantum key information by using the first public key, to obtain a first ciphertext, wherein the quantum key information comprises a quantum key;

calculating, by the quantum device, second authentication information based on the shared key, to obtain a second message authentication code value, wherein the second authentication information comprises the first ciphertext; and sending, by the quantum device to the application device, a key response packet corresponding to the key request packet, wherein the key response packet comprises the first ciphertext and the second message authentication code value.

11. The method according to claim 10, further comprising:

receiving, by the quantum device, a registration request packet from the application device;

sending, by the quantum device, a registration response packet to the application device, wherein the registration response packet comprises a certificate of the quantum device, the certificate comprises a second public key, and the second public key is a public key in a key pair obtained by the quantum device by running a post-quantum key generation algorithm;

in response to the quantum device receiving, from the application device, a registration packet comprising a second ciphertext, decrypting, by the quantum device, the second ciphertext by using a second private key, to obtain registration information, wherein the registration information comprises a derived key and the user identifier that corresponds to the application device, and the second private key is a private key in the key pair; and storing, by the quantum device, the storage information corresponding to the user identifier, wherein the storage information comprises the user identifier and the shared key that is obtained based on the derived key.

12. The method according to claim 10, wherein the verifying, by the quantum device, the first message authentication code value based on the shared key and the first authentication information comprises:

calculating, by the quantum device, the first authentication information based on the shared key, to obtain a fourth message authentication code value; and when the fourth message authentication code value is the same as the first message authentication code value, determining, by the quantum device, that the verification on the first message authentication code value succeeds.

13. The method according to claim 10, wherein the storage information further comprises the quantum key.

14. An application device, comprising:

a memory storing program instructions;

a network interface; and at least one processor, wherein after the at least one processor reads the program instructions stored in the memory, the application device is enabled to perform the following operations:

generating a derived key based on a target password by using a key derivation function;

sending a key request packet to a quantum device, wherein the key request packet comprises a user identifier corresponding to the application device, a first public key, and a first message authentication code value, wherein the user identifier is used by the quantum device to obtain storage information corresponding to the user identifier, and the storage information comprises a shared key corresponding to the quantum device and the user identifier, wherein the first public key is used by the quantum device to encrypt quantum key information allocated to the application device, the quantum key information comprises a quantum key, and the first public key is a public key in a key pair obtained by the application device by running a post-quantum key generation algorithm, wherein the first message authentication code value is obtained by the application device by calculating first authentication information based on the shared key, and the first authentication information comprises the first public key, and wherein the shared key is obtained based on the derived key;

receiving, from the quantum device, a key response packet corresponding to the key request packet, wherein the key response packet comprises a first ciphertext and a second message authentication code value;

verifying the second message authentication code value based on the shared key and second authentication information, wherein the second authentication information comprises the first ciphertext; and in response to the verifying performed by the application device on the second message authentication code value succeeding, decrypting the first ciphertext by using a first private key, to obtain the quantum key information, wherein the first private key is in the key pair.

15. The application device according to claim 14, wherein the key request packet further comprises a first statistical value, and after the program instructions are read by the at least one processor, the application device is enabled to further perform the following operations:

before sending the key request packet to a quantum device, obtaining a historical sending count of the key request packet comprising the user identifier; and adding a preset increment value to the historical sending count, to obtain the first statistical value.

16. The application device according to claim 15, wherein the key response packet further comprises a second statistical value, the second statistical value is a sending count that is recorded by the quantum device and that is of the key request packet comprising the user identifier, and after the program instructions are read by the at least one processor, the application device is enabled to further perform the following operation:

after the receiving a key response packet, when the second statistical value is not equal to the first statistical value, stopping a quantum key transmission procedure.

17. The application device according to claim 14, wherein after the program instructions are read by the at least one processor, the application device is enabled to further perform the following operations:

before sending the key request packet to the quantum device, in response to obtaining of an entered quantum key obtaining instruction, running the post-quantum key generation algorithm to generate the key pair, wherein the quantum key obtaining instruction comprises the target password; and calculating the first authentication information based on the shared key, to obtain the first message authentication code value.

18. The application device according to claim 14, wherein after the program instructions are read by the at least one processor, the application device is enabled to perform the following operations:

calculating the second authentication information based on the shared key, to obtain a third message authentication code value; and when the third message authentication code value is the same as the second message authentication code value, determining that the verification on the second message authentication code value succeeds.

19. The application device according to claim 14, wherein the storage information further comprises the quantum key.

20. A quantum device, comprising:

a memory storing program instructions;

a network interface; and at least one processor, wherein after the at least one processor reads the program instructions stored in the memory, the quantum device is enabled to perform the following operations:

receiving a key request packet from an application device, wherein the key request packet comprises a user identifier corresponding to the application device, a first public key, a first statistical value, and a first message authentication code value, wherein the first statistical value is a sending count that is recorded by the application device and that is of the key request packet comprising the user identifier;

obtaining, based on the key request packet, first authentication information and storage information that corresponds to the user identifier, wherein the storage information comprises a shared key corresponding to the quantum device and the user identifier, the first authentication information comprises the first public key, the storage information further comprises a second statistical value, the second statistical value is a sending count that is recorded by the quantum device and that is of the key request packet comprising the user identifier;

when the second statistical value is greater than or equal to the first statistical value, stopping, by the quantum device, a quantum key transmission procedure, or when the second statistical value is less than the first statistical value, updating, by the quantum device, the second statistical value, to enable an updated second statistical value to be equal to the first statistical value;

verifying the first message authentication code value based on the shared key and the first authentication information;

in response to the verifying performed by the quantum device on the first message authentication code value succeeding, encrypting quantum key information by using the first public key, to obtain a first ciphertext, wherein the quantum key information comprises a quantum key;

calculating second authentication information based on the shared key, to obtain a second message authentication code value, wherein the second authentication information comprises the first ciphertext; and sending, to the application device, a key response packet corresponding to the key request packet, wherein the key response packet comprises the first ciphertext and the second message authentication code value.

21. The quantum device according to claim 20, wherein after the program instructions are read by the at least one processor, the quantum device is enabled to further perform the following operations:

receiving a registration request packet from the application device;

sending a registration response packet to the application device, wherein the registration response packet comprises a certificate of the quantum device, the certificate comprises a second public key, and the second public key is a public key in a key pair obtained by the quantum device by running a post-quantum key generation algorithm;

in response to a registration packet comprising a second ciphertext being received from the application device, decrypting the second ciphertext by using a second private key, to obtain registration information, wherein the registration information comprises a derived key and the user identifier that corresponds to the application device, and the second private key is a private key in the key pair; and storing the storage information corresponding to the user identifier, wherein the storage information comprises the user identifier and the shared key that is obtained based on the derived key.

22. The quantum device according to claim 20, wherein after the program instructions are read by the at least one processor, the quantum device is enabled to perform the following operations:

calculating the first authentication information based on the shared key, to obtain a fourth message authentication code value; and when the fourth message authentication code value is the same as the first message authentication code value, determining that the verification on the first message authentication code value succeeds.

23. The quantum device according to claim 20, wherein the storage information further comprises the quantum key.

* * * * *